United States Patent [19]
Booth

[11] Patent Number: 6,065,073
[45] Date of Patent: May 16, 2000

[54] AUTO-POLLING UNIT FOR INTERRUPT GENERATION IN A NETWORK INTERFACE DEVICE

[75] Inventor: Bradley J. Booth, Austin, Tex.

[73] Assignee: Jato Technologies, Inc., Austin, Tex.

[21] Appl. No.: 09/135,340

[22] Filed: Aug. 17, 1998

[51] Int. Cl.[7] .............................. G06F 9/48; G06F 13/24; G06F 13/22; H04L 12/00
[52] U.S. Cl. .............................. 710/46; 710/15; 710/266; 709/203; 709/253; 713/100; 714/47; 370/908
[58] Field of Search ...................................... 709/203, 218, 709/250, 252, 253, 223; 710/8, 15, 18, 46, 47, 129, 220, 266, 267; 714/47, 4, 48, 25, 819; 713/100; 359/109, 118; 370/908, 901, 906; 340/825.06; 455/9

[56] References Cited

U.S. PATENT DOCUMENTS

| | | |
|---|---|---|
| 4,451,916 | 5/1984 | Casper et al. . |
| 4,761,762 | 8/1988 | Holmes . |
| 5,561,767 | 10/1996 | Eisenberg et al. . |
| 5,566,319 | 10/1996 | Lenz . |

*Primary Examiner*—Gopal C. Ray
*Attorney, Agent, or Firm*—Conley, Rose & Tayon P.C.; Jeffrey C. Hood; Dean M. Muryon

[57] ABSTRACT

A system and method for auto-polling a status register within a physical layer (PHY) interface to a local area network (LAN). The system includes a host CPU which needs to detect and service interrupts generated by a PHY device on the LAN which is coupled between a first transmission medium (such as copper or fiber cable) and a management interface to the system. The system further includes an auto-polling unit which monitors activity on the management interface of the PHY device. When the auto-polling unit detects a lack of activity on the management interface of the PHY for a predetermined interval, the auto-polling unit reads a first value from the PHY status register. This first status value is then compared to a previously stored value which corresponds to the last PHY status value read by the host CPU. If a mismatch is detected between these two values, an interrupt is generated to the CPU. In response to receiving the interrupt, auto-polling is suspended (to avoid changing the status data that caused the interrupt) and the CPU requests a read of the status value in the first register. In this manner, the CPU is able to access the status value which caused the interrupt and determine the appropriate course of action. This status read by the CPU also has the effect of clearing the interrupt. This system frees the CPU from having to continually poll the PHY status register to determine if a change in status has occurred.

38 Claims, 16 Drawing Sheets

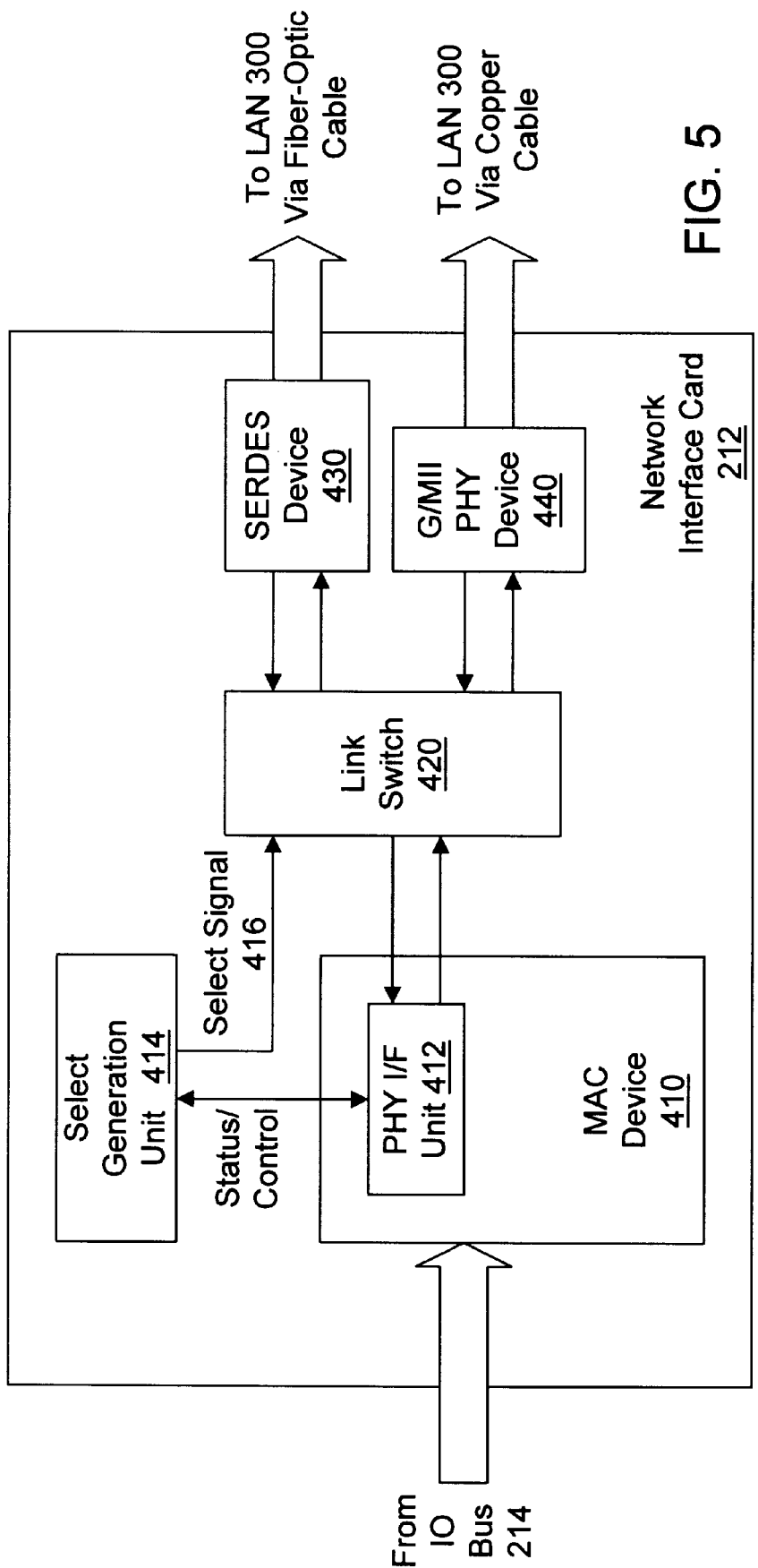

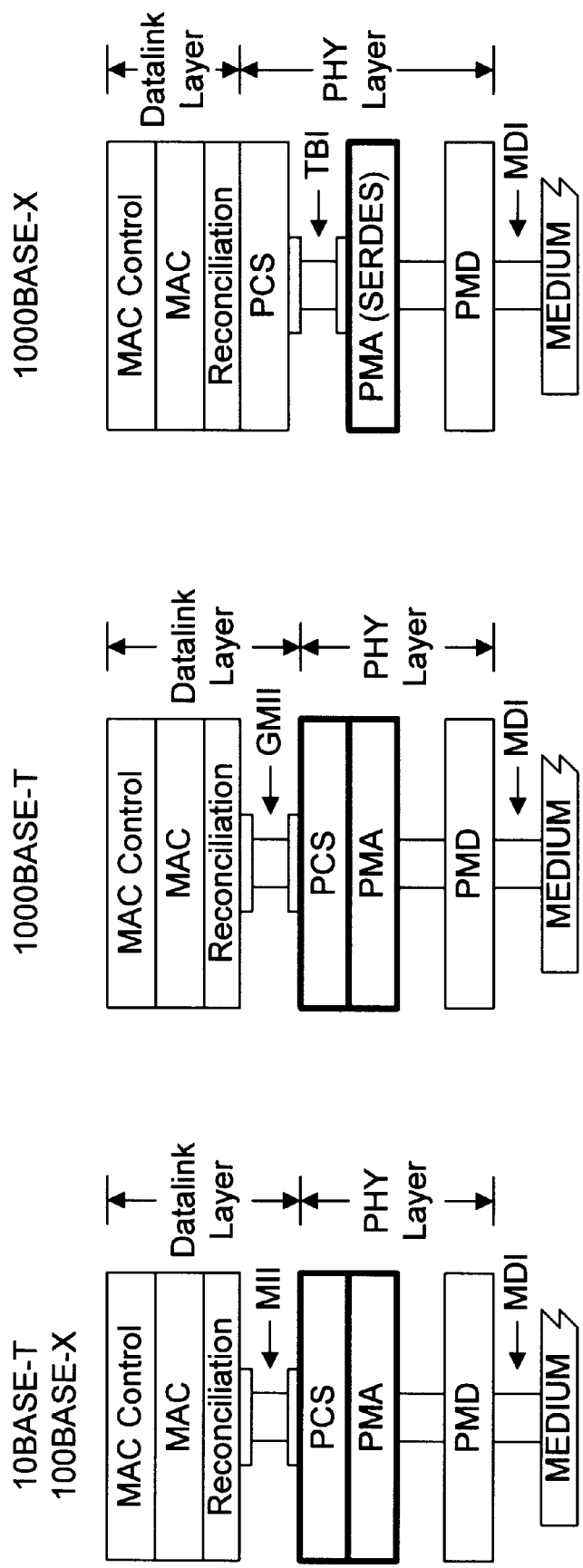

AUTO-POLLING UNIT FOR INTERRUPT GENERATION IN A NETWORK INTERFACE DEVICE

FIELD OF THE INVENTION

This invention relates to the field of interface hardware for local area networks, and more particularly to a network interface which efficiently switches between different links to a local area network.

DESCRIPTION OF THE RELATED ART

Local area networks (LANs) have forever changed corporate and personal computing. First used for sharing simple information and resources among personal computer users, LANs have dramatically evolved over the last ten years to become the premier strategic computing platform for businesses today. All but the smallest corporations rely on LANs and their dependence and appetite for this technology shows no signs for slowing. Indeed, LANs have matured to the point of peer status with personal computers themselves. As the market and deployment of ever more powerful computers continues to grow, the expectation of providing equally high performance network connectivity grows as well.

One example of a local area network, LAN 10, is depicted in FIG. 1. As shown, LAN 10 includes a server computer 14 and a plurality of client computers 16. Computers 14 and 16 are coupled by LAN hardware 12, which includes the actual transmission medium (e.g., fiber-optic cable or copper cable such as unshielded twisted pair (UTP)) as well as various network hardware elements such as hubs, switches and routers.

The advantages of LANs are numerous. By providing easy access to shared data (on server computer 14, for example), computer users are allowed to interpolate more effectively. Users are also able to share expensive peripheral devices such as printers, faxes and CD-ROMs between client computers 16. These peripheral devices are also coupled to the various client computers via LAN hardware 12. The cost of client computers may also be decreased by lessening the needs for high-capacity disk drives on individual workstations. By storing data on one or more central servers accessible through the LAN, this also provides an easier solution for backup of vital data.

A LAN includes two or more computer systems which are physically and logically connected to one another. The type of connection between the computer systems is referred to as the topology of the LAN. In a bus topology, computer systems and devices are attached at different points along a bus. Data is then transmitted throughout the network via the cable. The speed of transmission of the network is governed by the type of cable. One disadvantage of this topology is that a break in the cable disables the entire network. Furthermore, provisions have to be made for re-transmission of data in cases in which multiple computers contend for the bus (cable) at the same time, causing data collision (and possible loss of data).

Another type of topology is the ring topology, in which computer systems are daisy-chained together in a circle. In such a configuration, data is transmitted from node to node (computer to computer). The data is passed from computer to computer until the correct destination is reached. While this avoids the problem of data collision, a break in the connection disables the entire network.

A third type of topology is the star topology. In this configuration, all computer systems are routed to a central location called a hub. This allows for easy modification of the network (adding, deleting, moving computers) without having to bring down the entire network. Furthermore, the entire network does not go down if one individual connection is broken.

Hybrid topologies combining one or more of the above network configurations may also be utilized to further increase flexibility.

In order to permit a full range of data communications among disparate data equipment and networks, the International Standards Organization (ISO) developed a reference model known as Open System Interconnection (OSI) in 1974. OSI is a seven-layer model which ideally allows standardized procedures to be defined, enabling the interconnection and subsequent effective exchange of information between users. OSI defines the functions of each layer but does not provide the software and hardware to implement the model. The model's goal is to set a standard for communication product vendors. The seven layers in sequence from top (layer 7) to bottom (layer 1) are as follows: application, presentation, session, transport, network, data link, and physical. A given network does not have to implement each layer of OSI to be compatible with this standard.

Layer 7, the application layer, is responsible for specialized network functions such as file transfer, virtual terminal, and electronic mail. The purpose of this layer is to serve as the window between correspondent application processes which are using the OSI to exchange meaningful data. Examples of application layer protocols include SNMP, RLOGIN, TFTP, FTP, MIME, NFS, and FINGER. Layer 6, the presentation layer, is responsible for data formatting, character code conversion, and data encryption of data generated in the application layer. This layer is not always implemented in a network protocol. Layer 5, the session layer, provides for negotiation and establishment of a connection with another node. To do this, the session layer provides services to (a) establish a session connection between two presentation entities and (b) support orderly data exchange interactions. This includes establishing, maintaining, and disconnecting a communication link between two stations on a network, as well as handling name-to-station address translation. (This is similar to placing a call to someone on the telephone network with knowing only his/her name, wherein the name is reduced to a phone number in order to establish the connection).

Layer 4, the transport layer, handles the reliable end-to-end delivery of data. This layer ensures that data is delivered in the same order that it was sent. It also ensures that data is transmitted or received without error, and in a timely manner. Transmission control protocol (TCP) is a common transport layer protocol. Layer 3, the network layer, routes packets of information across multiple networks, effectively controlling the forwarding of messages between stations. On the basis of certain information, this layer will allow data to flow sequentially between two stations in the most economical path both logically and physically. This layer allows units of data to be transmitted to other networks though the use of special devices known as routers. Internet Protocol (IP) is an example of a network layer protocol which is part of the TCP/IP protocol suite.

Layer 2, the data link layer, is responsible for transfer of addressable units of information, frames, and error checking. This layer synchronizes transmission and handles frame-level error control and recovery so that information can be transmitted over the physical layer. Frame formatting and cyclical redundancy checking (CRC), which checks for errors in the whole frame, are accomplished in this layer. It also provides the physical layer addressing for transmitted frame. Serial Line IP (SLIP) and point-to-Point Protocol (PPP) are examples of data link protocols. Finally, layer 1, the physical layer, handles the transmission of binary data over a communications network. This layer includes the physical wiring (cabling), the devices that are used to connect a station's network interface controller to the wiring, the signaling involved to transmit/receive data, and the ability to detect signaling errors on the network media. ISO 2110, IEEE 802, and IEEE 802.2 are examples of physical layer standards.

For a bus or star topology, a transmission protocol is needed for devices operating on the bus to deal with the problem of data collision (two devices transmitting data over the bus at the same time). One such technique implemented in the OSI data link layer is called carrier sense multiple access/collision detect (CSMA/CD). Under this technique, hardware residing in a network interface card (NIC) within a given computer system senses the voltage change of the bus before attempting transmission of data. If no bus activity is detected, the data is transmitted over the bus to the appropriate destination. If bus activity is detected, however, the NIC holds off the access for a predetermined amount of time before re-trying the transmission. In such a manner, the integrity of the transmitted data is preserved.

The CSMA/CD technique is employed by a LAN protocol known as Ethernet, which was developed by Xerox Corporation in cooperation with DEC and Intel in 1976. Ethernet uses a bus/ring topology and originally served as the basis for IEEE 802.3, a standard which specifies the physical and lower software layers. Ethernet technology is by far the most predominant networking protocol in use today, accounting for some 80% of all installed network connections by year-end 1996. All popular operating systems and applications are Ethernet-compatible, as are upper-layer protocol stacks such as TCP/IP (UNIX, Windows, Windows 95), IPX (Novell NetWare), NetBEUI (for LAN manager and Windows NT networks) and DECnet (for Digital Equipment Corp. computers). Other LAN technologies which are less popular than Ethernet include Token Ring, Fast Ethernet, Fiber Distributed Data Interface (FDDI), Asynchronous Transfer Mode (ATM), and LocalTalk. Ethernet is the most widely utilized because of the balance it strikes between speed, cost and ease of installation.

The Ethernet standard is defined by the Institute for Electrical and Electronic Engineers (IEEE) as IEEE Standard 802.3. This standard defines rules for configuring an Ethernet as well as specifying how elements in an Ethernet network interact with one another. By adhering to the IEEE standard, network equipment and network protocols interoperate efficiently.

Original LANs based on Ethernet technology supported a data transfer rate of up to 10 Megabits per second (Mbps). IEEE 802.3 specifies several different types of transmission media configured to meet this transmission rate. 10Base-2 is a transmission medium which is capable of carrying information via low-cost coaxial cable over distances of up to 185 meters at 10Mbps. This is also referred to as "thin Ethernet". "Thick Ethernet" (10Base-5), conversely, is configured to transmit up to distances of 500m over 50-ohm coaxial cable at this same rate. A fiber-optic standard, 10Base-FL, allows up to 2,000m of multimode duplex cable in a point-to-point link. The most popular wiring scheme at the 10Mbps rate, however, is the 10Base-T standard, which utilizes twisted pair conductors (also called UTP-unshielded twisted pair) to carry information up to 100m using Category 3 UTP wiring or better. UTP wiring comes in grades 1–7. Category 3 wiring supports transmission rates of up to 16Mbps. Category 5 cable, while more expensive, can support up to 100Mbps. Category 7 cable is the highest, most expensive grade of UTP cable.

In order to meet the demand for higher transmission speeds, the Fast Ethernet standard (IEEE 802.3u) was established in 1995. This standard raised the Ethernet bus speeds from 10 Mbps to 100 Mbps with only minimal changes to the existing cable structure. The Fast Ethernet standard had the added advantage of being backward-compatible with the 10Mbps Ethernet standard, allowing users to migrate to the new standard without abandoning existing hardware. Like the original Ethernet standard, Fast Ethernet includes several different transmission media. 100Base-T is a generic name for 100Mbps twisted pair CSMA/CD proposals. Specific proposals include 100Base-T4 and 100Base-TX. The 100BASE-T4 standard allows for support of 100 Mbps Ethernet over Category 3 cable, but at the expense of adding another pair of wires (4 pair instead of the 2 pair used for 10BASE-T). For most users, this is an awkward scheme and therefore 100BASE-T4 has seen little popularity. 100Base-TX, on the other hand, is the most popular solution for a 100Mbps Ethernet, utilizing two pairs of Category 5 UTP wiring.

Even with 100Mbps Ethernet for LANs, new and existing network applications are evolving to embrace high-resolution graphics, video, and other rich media data types. Consequently, pressure is growing throughout the network for increased bandwidth. For example, many applications demand ultra-high bandwidth networks to communicate 3D visualizations of complex objects ranging from molecules to aircraft. Magazines, brochures, and other complex, full-color publications prepared on desktop computers are transmitted directly to digital-input printing facilities. Many medical facilities transmit complex images over LANs, enabling the sharing of expensive equipment and specialized medical expertise. Engineers are using electronic and mechanical design automation tools to work interactively in distributed development teams, sharing files which hundreds of gigabytes in sizes. Additionally, the explosion of Intranet technology is leading to a new generation of multimedia client/server applications utilizing bandwidth-intensive audio, video, and voice. In short, the accelerating growth of LAN traffic is pushing network administrators to look to higher-speed network technologies to solve the bandwidth crunch.

The Gigabit Ethernet standard proposed in IEEE 802.3z offers a migration path for Ethernet users. The IEEE 802.3z standard allows half- and full-duplex operation at speeds of 1000 Mbps, relying on the 802.3 Ethernet frame format and CSMA/CD access method with support for one repeater per collision domain. The Gigabit Ethernet standard is also backward-compatible with 10BaseT and 100BaseT Ethernet technologies.

Much of the IEEE 802.3z standard is devoted to definitions of physical layer standards (PHYs) for Gigabit Ethernet. This standard uses the Fibre Channel-based 8b/10b coding at the serial line rate of 1.25 Gbps. Like other network models, Gigabit Ethernet implements functionality adhering to a physical layer standard. For Gigabit Ethernet communications, several physical layer standards are emerging.

Two PHYs currently exist for providing Gigabit transmission over fiber-optic cabling. A 1000Base-SX is targeted at low cost multimode fiber runs in horizontal and shorter backbone applications. 1000Base-LX, meanwhile, is targeted at multimode fiber and single-mode fiber runs in longer backbone applications, such as building backbones or campus backbones. For multimode fiber, these standards define gigabit transmission over distances of 2 to 550 meters, and for single-mode fiber, distances of 2 to 5000 meters.

There are also two standards efforts for Gigabit Ethernet transmission over copper cabling. The first copper link standard has been defined in IEEE 802.3z and is referred to as 1000Base-CX. This standard supports interconnection of equipment clusters where the physical interface is short-haul copper. It supports a switching closet or computer room as a short jumper interconnection for 25 meter distances. This standard runs over 150-ohm balanced, shielded, specialty cabling assemblies known as twinax cable. This copper physical layer standard has the advantage that it can be generated quickly and is inexpensive to implement.

The second copper link standard is intended for use in horizontal copper cabling applications. This standard is governed by the IEEE 802.03ab task force, which is chartered with the development of a 1000Base-T physical layer standard providing 1Gbps Ethernet signal transmission over four pairs of Category 5 UTP cable, covering distances up to 100 meters or networks with a diameter of 200 meters. This standard, which uses new technology and new coding schemes in order to meet the potentially difficult and demanding parameters set by the previous Ethernet and Fast Ethernet standards, is expected to ratified sometime in late 1998 or early 1999. The 1000Base-T standard utilizes a PHY interface referred to as GMII ("Gigabit Medium Independent Interface"), which is similar to the MII used in 10Base-T and 100Base-X. GMII, however, provides a byte-wide interface as opposed to the nibble-wide interface of MII. MII, GMII, and TBI are discussed in greater detail below.

Regardless of the particular physical interface utilized in Ethernet, Fast Ethernet, or Gigabit Ethernet, the host CPU of the system requires access to a status register within the PHY device in order to monitor the state of the device. Device status is needed by the host CPU in order to determine if an interrupt condition is present (the link is down, for example). This status register is defined to be PHY register 1 (out of 31 possible) for both GMII and MII. (GMII also includes an Extended Status Register 15, however this only includes abilities of the device, and does not change during actual operation. This register is thus not utilized for detecting status).

The interface to the management registers of a PHY device is described in IEEE Standard 802.3u clause 22 as a two-wire interface. The standard defines a bi-directional data line (referred to as "MDIO") and a clock signal ("MDC"). These two signal make up the management interface to the PHY device.

FIG. 2A depicts the CPU-PHY interface of a prior art computer system 100. As shown, system 100 includes a host CPU 110, a LAN controller 120, and a PHY device 130. Host CPU 10 is coupled to LAN controller 120 via a port 112. In one embodiment this port may be a system bus coupled to controller 120 via a 10 bridge chip. LAN controller is coupled to PHY device 130 by interface 122, while CPU 110 is coupled to PHY 130 via a management interface including clock signal 132 and data line 134. Computer system is coupled to an external network 140 via a transmission medium 136, such as copper or fiber cable.

For interrupt determination within computer system 100, CPU 110 needs to determine if there has been a change in a status register within PHY device 130. Given the configuration of system 100, however, CPU 110 is required to continually poll the desired register via the MDC/MDIO interface of signals 132 and 134 to detect such a change. This method creates a drain on the bandwidth of CPU 110, particularly if the polling process returns infrequent status changes. Such polling thus may affect the overall system performance.

This problem is also encountered in an alternate prior art embodiment shown in FIG. 2B. As shown, FIG. 2B depicts a computer system 150, which includes similarly numbered elements to computer system 100 of FIG. 2A. Unlike computer system 100, however, CPU 110 of computer system 150 polls PHY 130 by signaling LAN controller 120 via port 112. LAN controller 120, in turn, then polls PHY 130 via the management interface bus of signals 132 and 134. While this method avoids the direct CPU-PHY coupling of FIG. 2A, CPU 110 of FIG. 2B is still required to continually request polling information from LAN controller 130. Thus, the performance of computer system 150 is also sub-optimal.

It would therefore be desirable to have a more efficient means of polling a status register of a physical layer interface device.

SUMMARY OF THE INVENTION

The present invention comprises a network interface system and method, such as a network interface card (NIC) within a computer system, which is configured to dynamically switch between a first physical layer device and a second physical layer device in establishing a network link. The first physical layer device is coupled to a first transmission medium, while the second physical layer device is coupled to a second transmission medium. Both transmission media are operable to establish a network link. Switching may occur between the physical layer devices if an active link is determined to be down or unreliable.

The first physical layer device is one which requires a continuous connection to the computer system if active. A SERDES device is one example of such a device. If a SERDES device has established a connection with a link partner, the SERDES must be selected for active use by the NIC. In contrast, a G/MII device may establish a connection with a link partner without being selected for active use by the NIC.

The NIC includes a link switching unit coupled to both the first physical layer device and the second physical layer device, as well as a physical layer interface unit coupled to the link switching unit. The NIC further includes a control unit configured to generate a select signal indicative of whether the first physical layer device or the second physical layer device is currently selected. This select signal is then conveyed to the link switching unit and the physical layer interface unit.

The link switching unit is configured to transfer data between the physical layer interface unit and a currently selected physical layer device indicated by the select signal. The link switching unit is also coupled to the physical layer interface unit, which in turn couples to an external interface of the network interface card. The external interface connects the NIC to a remainder of the network device, e.g., a computer system.

The physical layer interface unit is configured to transfer data between the link switching unit and the external interface. The physical layer interface unit receives incoming data from both the external interface and the link switching unit. The interface unit includes a first physical layer interface sub-unit and a second physical layer interface sub-unit. The first physical layer interface sub-unit is configured to process the incoming data according to an interface of the first physical layer device, while the second physical layer interface sub-unit is configured to process the incoming data according to an interface of the second physical layer device. Both sub-units generate outgoing data in response to the incoming data. The physical layer interface unit then selects the appropriate outgoing data in response to the currently selected physical layer device.

In one embodiment, the first physical layer device is a SERDES device and the second physical layer device is a G/MII device. Accordingly, in such an embodiment, the first physical layer interface sub-unit is a physical coding sublayer and the second physical layer interface sub-unit is a G/MII reconciliation sublayer.

Dynamic switching may occur either from the first physical layer device to the second physical layer device or vice-versa. In order to switch from the first physical layer device to the second physical layer device, an indication is sent that the link established through the first physical layer device is going off-line. This ensures that link partners are notified of the pending change in link status. Next, the first physical layer device is put into isolation. The link unit is then switched from coupling to the first physical layer device to the second physical layer device. This establishes a connection from the second physical layer device to the physical layer interface unit via the link switching unit. The physical layer interface unit is then signaled that incoming data corresponds to an interface specified by the second physical layer device. Accordingly, the outgoing data generated by the second physical interface sub-unit is now selected. This establishes a connection from the link switching unit to the external interface of the NIC via the physical layer interface unit. Finally, the second physical layer device is configured and de-isolated. A network connection may now be established via the second physical layer device.

In order to switch from the second physical layer device to the first physical layer device, the process is similar. First, an indication is sent that the link established through the second physical layer device is going off-line. Next, the second physical layer device is put into isolation. Then the physical layer interface unit is signaled that incoming data corresponds to an interface specified by the first physical layer device. Accordingly, the outgoing data generated by the first physical interface sub-unit is now selected. This establishes a connection from the link switching unit to the external interface of the NIC via the physical layer interface unit. Next, the link unit is switched from coupling to the second physical layer device to the first physical layer device. This establishes a connection from the first physical layer device to the physical layer interface unit via the link switching unit. Finally, the first physical layer device is configured and de-isolated. A network connection may now be established via the first physical layer device.

This system provides a smooth migration path for network users of LANs which include both fiber-optic and copper transmission media. By having the capability to switch between a number of devices (including a fiber-optic device such as a SERDES device), network responsiveness, reliability and flexibility are enhanced. In addition, the present invention allows improved rendering of network interfaces using a single NIC. The system can be configured to monitor the active link and dynamically switch between PHYs for improved redundancy.

The present invention also comprises a system and method for monitoring a currently established network link. In prior art systems, a host CPU in a computer system is required to continually poll a register in a network interface card in order to test the status of the currently established link. This has the disadvantage of becoming a drain on the bandwidth of the host CPU, particularly if the polling does not frequently result in retrieval of updated status values. This decrease in bandwidth adversely affects system performance.

In one embodiment, the present invention includes a system for auto-polling to determine the current link status. This system includes a host CPU and a network interface card (NIC), wherein the NIC includes, a physical layer device and an auto-polling unit. The physical layer interface device is coupled to a network via a first transmission medium. Control values for this device may be changed via a management interface (such as the MDIO/MDC interface defined by IEEE standard 802.3u, clause 22). Status values for the device are included within a designated status register.

The auto-polling unit is configured to monitor activity on the management interface of the physical layer interface device. If no activity is detected on the management interface for a predetermined period of time, the auto-polling unit reads a first status value from the status register of the physical layer interface device. (The predetermined period of time may be a predefined constant, or may be varied by the host CPU). This first status value is then compared to a second status value. This second status value is the last physical layer status value read by the host CPU.

If the first and second status values are the same, the auto-polling continues monitoring activity on the management interface of the physical layer interface device. If there is a mismatch between the first and second status values, however, an interrupt is generated to the host CPU. The host CPU, in turn requests a read of the first status value (that is, the data which caused an interrupt to be generated). The read performed by the CPU causes the interrupt to be de-asserted.

Because the network interface card in this system signals the host CPU whenever an interrupt condition has been detected, the CPU does not have to waste bandwidth by continually polling network interface devices. This leads to a more efficient use of system resources, particularly CPU bandwidth. The auto-polling method used in this system thus results in increased overall system efficiency and performance.

BRIEF DESCRIPTION OF THE DRAWINGS

A better understanding of the present invention can be obtained when the following detailed description of the preferred embodiment is considered in conjunction with the following drawings, in which:

FIG. 5 is a high-level block diagram of a network interface card which includes a link switch unit between a SERDES and G/MII devices according to one embodiment of the present invention;

FIGS. 6A–C depict how the OSI reference model sublayers map to the PHY interfaces used by different transmission media;

Figure 1:
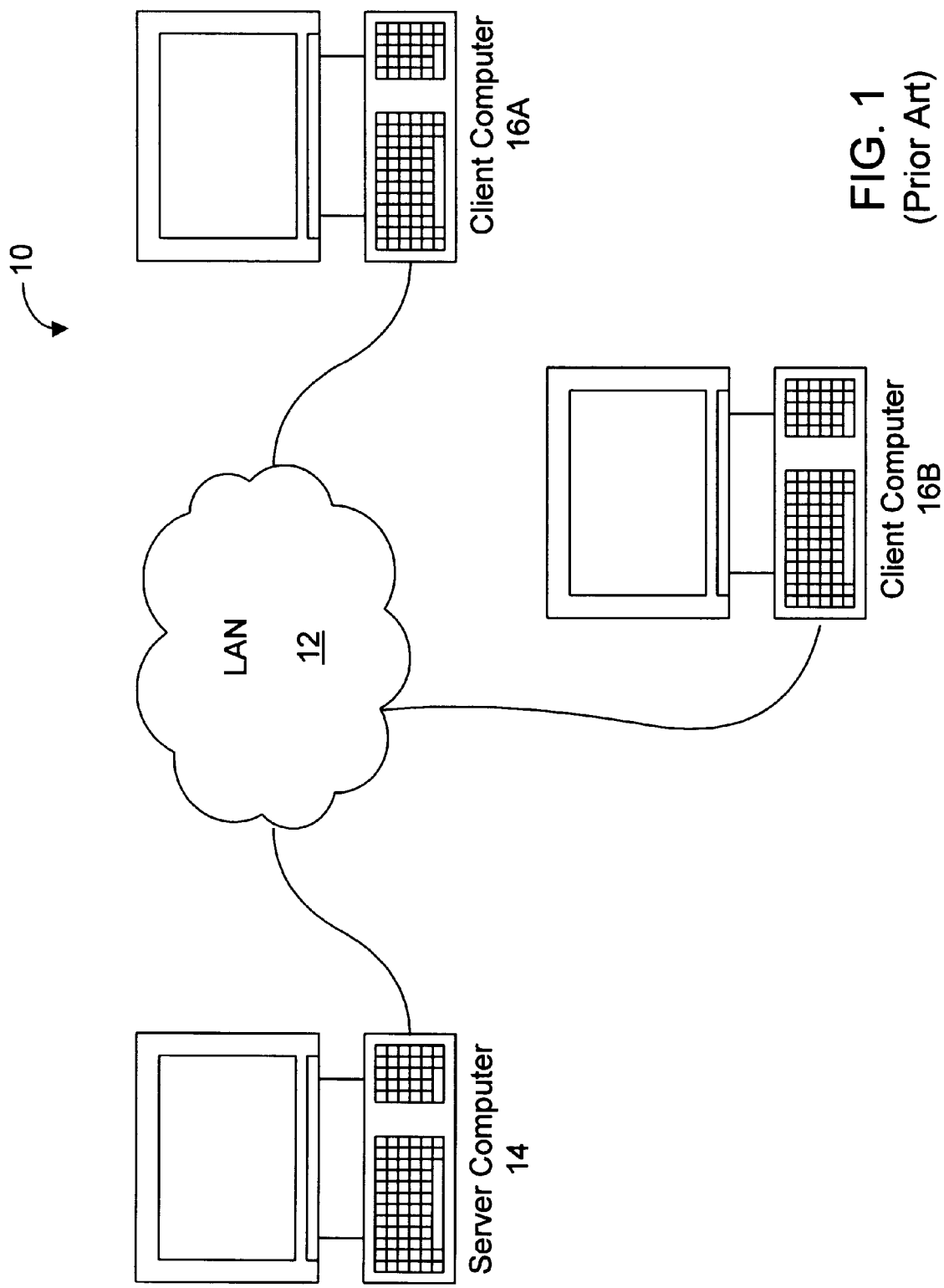
FIG. 1 is block diagram of a prior art local-area network.
Figure 2A:
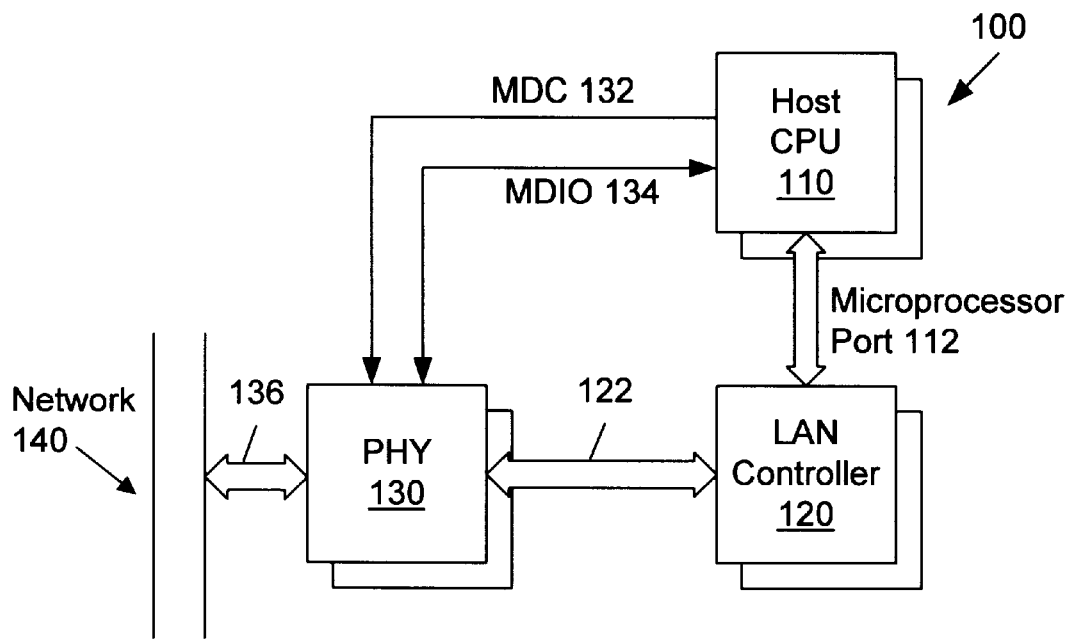
FIGS. 2A–B are block diagram of prior art CPU-PHY interfaces.
Figure 2B:
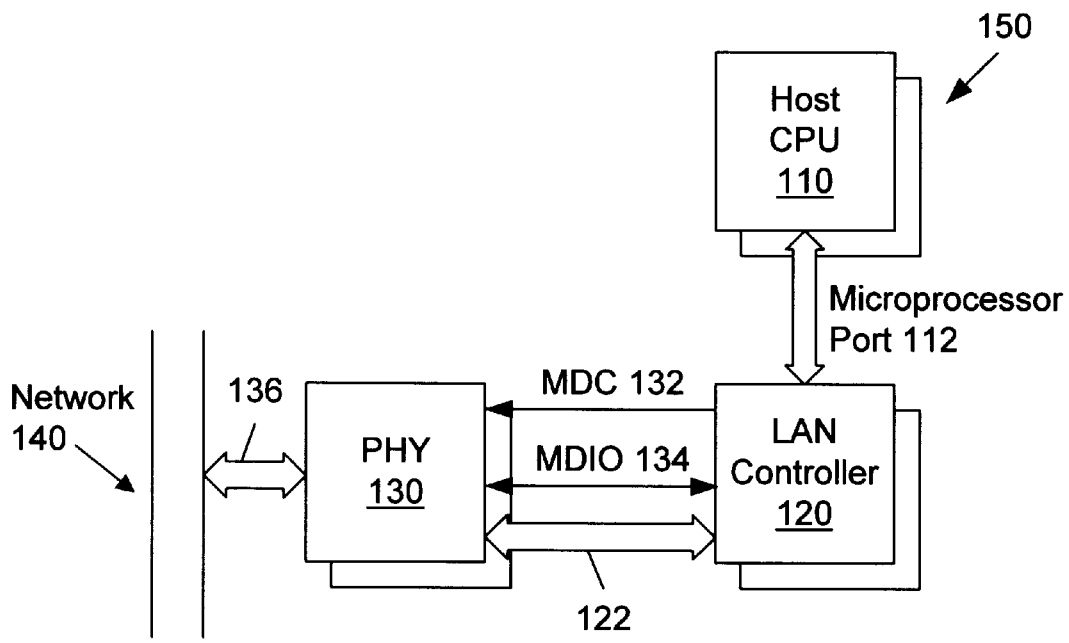

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

Figure 3:
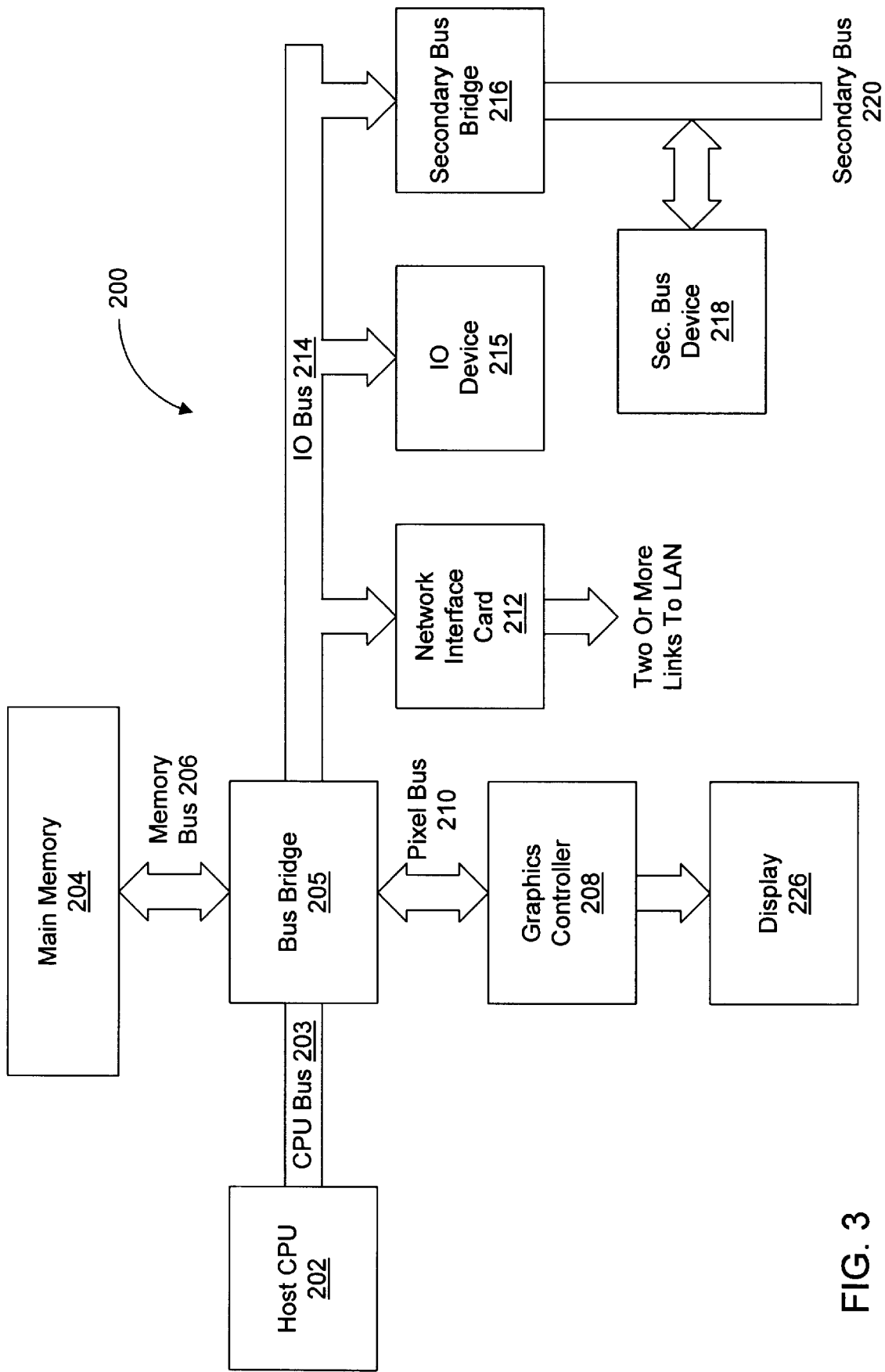
FIG. 3 is a high-level block diagram of a computer system which includes a network interface card according to one embodiment of the present invention.

DETAILED DESCRIPTION OF THE EMBODIMENTS FIG. 3—Computer System

FIG. 3 depicts a computer system 200 which includes a network interface card (NIC) according to one embodiment of the present invention. The present invention may be used in any of various types of network devices, including computer systems, networked printers, hubs, switches, routers, etc. In the following description the present invention is described with reference to a computer system.

As will be described in greater detail below, the NIC within computer system 200 is configured to dynamically switch between different network interfaces to a local-area network (LAN). This switch operation may couple the NIC to a second network link in response to a first network link being detected as down or unreliable.

As used herein, the terms "dynamically switching" and "dynamic switch" refer to the fact that the NIC of computer system 200 can perform on-the-fly switching between a first network interface and a second network interface. No intervention from a user of computer system 200 (or a network administrator) is required. This switching may thus be performed automatically as needed. This allows system 200 to seamlessly shift to a second network interface if a first network interface is down or becomes unreliable.

As shown, computer system 200 includes a host CPU 202 coupled to a bus bridge unit 205 via a CPU bus 203. CPU 202 may be any of various types of computer processors, including uniprocessors and multiprocessors. Similarly, host bus 203 may be any of a variety of high-speed buses designed for communication between host processors, memory subsystems, and specialized subsystems.

Bus bridge unit 205 couples to a system memory 204 (via a memory bus 206), graphics controller 208 (via a pixel bus 210), and various IO devices (via an 10 bus 214). Main memory 204 may be any of various types of memory subsystems, including random access memories (RAMs) and mass storage devices.

In the embodiment shown in FIG. 3, graphics accelerator or video device 208 is coupled to host CPU 202 via bus bridge unit 205. Graphics accelerator 208 is configured to render pixel data received via bus 205. The pixel data rendered by graphics controller 208 is converted to a video signal for display on device 226 (which may be, in one embodiment, a multi-display system). Bus bridge unit 205 also couples to one or more input/output devices via IO bus 214 (which may be a PCI bus in one embodiment). As shown in FIG. 3, 10 bus 214 couples to network interface card 212 and generic 10 device 215.

Network interface card 212 provides computer system 200 with one or more links to an attached LAN (or, alternately, different LANs or MANs). As will be described below, the one or more links provided by NIC 212 may be coupled to different transmission media (that is, different types of physical cabling). NIC 212 is thus configured to receive network data and convert this received data into a format recognizable by the software-implemented portions of the chosen communications protocol. Conversely, NIC 212 is also configured to receive outgoing data, format this data accordingly, and transmit the formatted data over the chosen network interface.

Generic IO device 215 is representative of other types of IO devices which may be attached to bus 214. In one embodiment, device 215 may be a SCSI interface to mass storage of computer system 200. IO bus 214, in one embodiment, also couples to a secondary bus 220 via a secondary bus bridge unit 216. In an embodiment in which IO bus 214 is a high-speed bus such as a PCI bus, secondary bus 220 may be an ISA/EISA bus which couples to "native" IO devices 218 (such as a keyboard, a mouse, or other position tracking devices).

As described above, NIC 212 is configured to provide dynamic switching between different physical layer devices. Different LAN configurations which may utilize such a NIC are shown with reference to FIGS. 4A–B, while FIGS. 5–10 discuss the operation of NIC 212 and the dynamic switching process in greater detail.

Figure 4A:
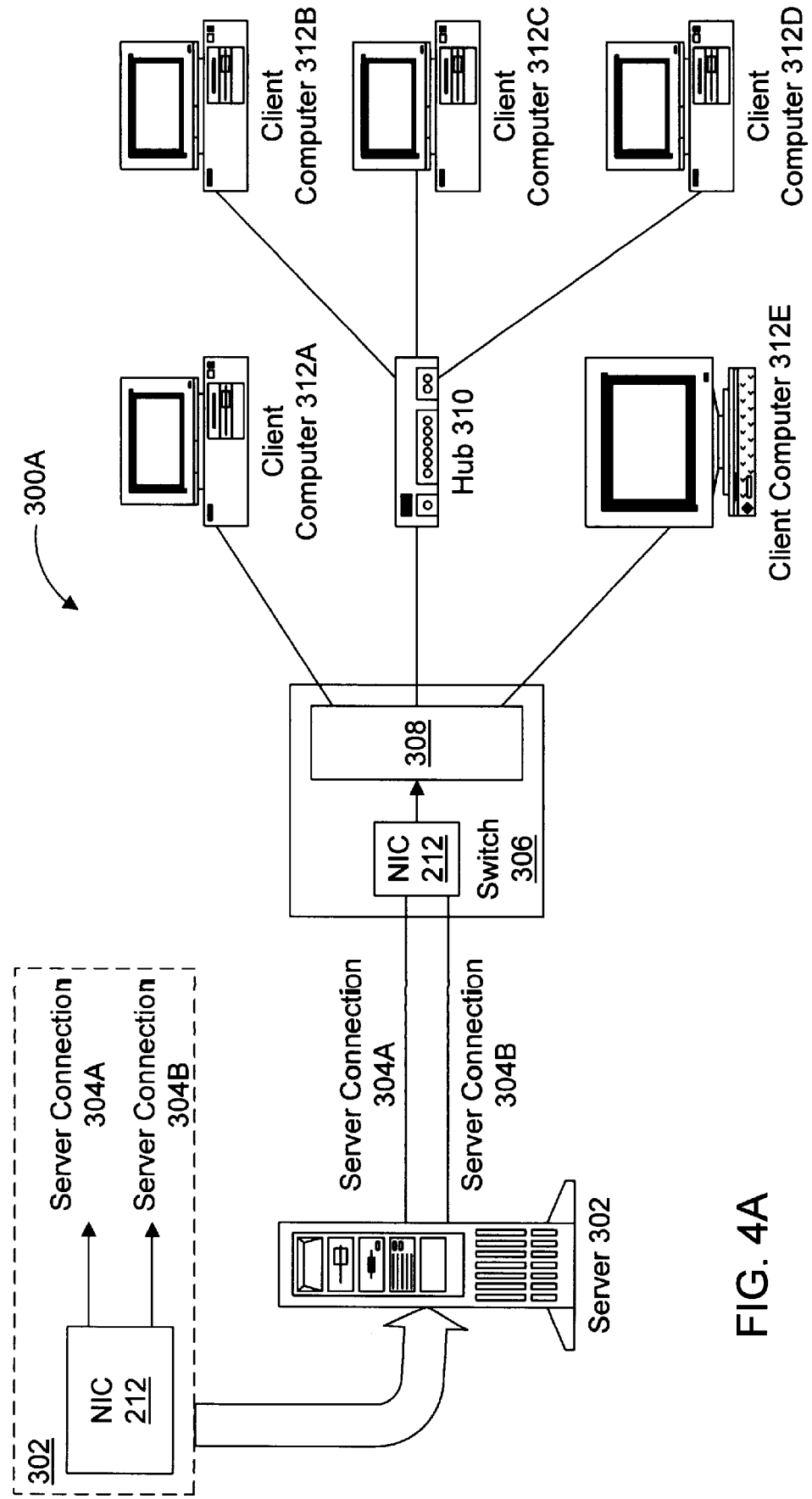
FIGS. 4A–B depicts different LAN configurations which include computer systems having network interface connections according to one embodiment of the present invention.
Figure 4B:
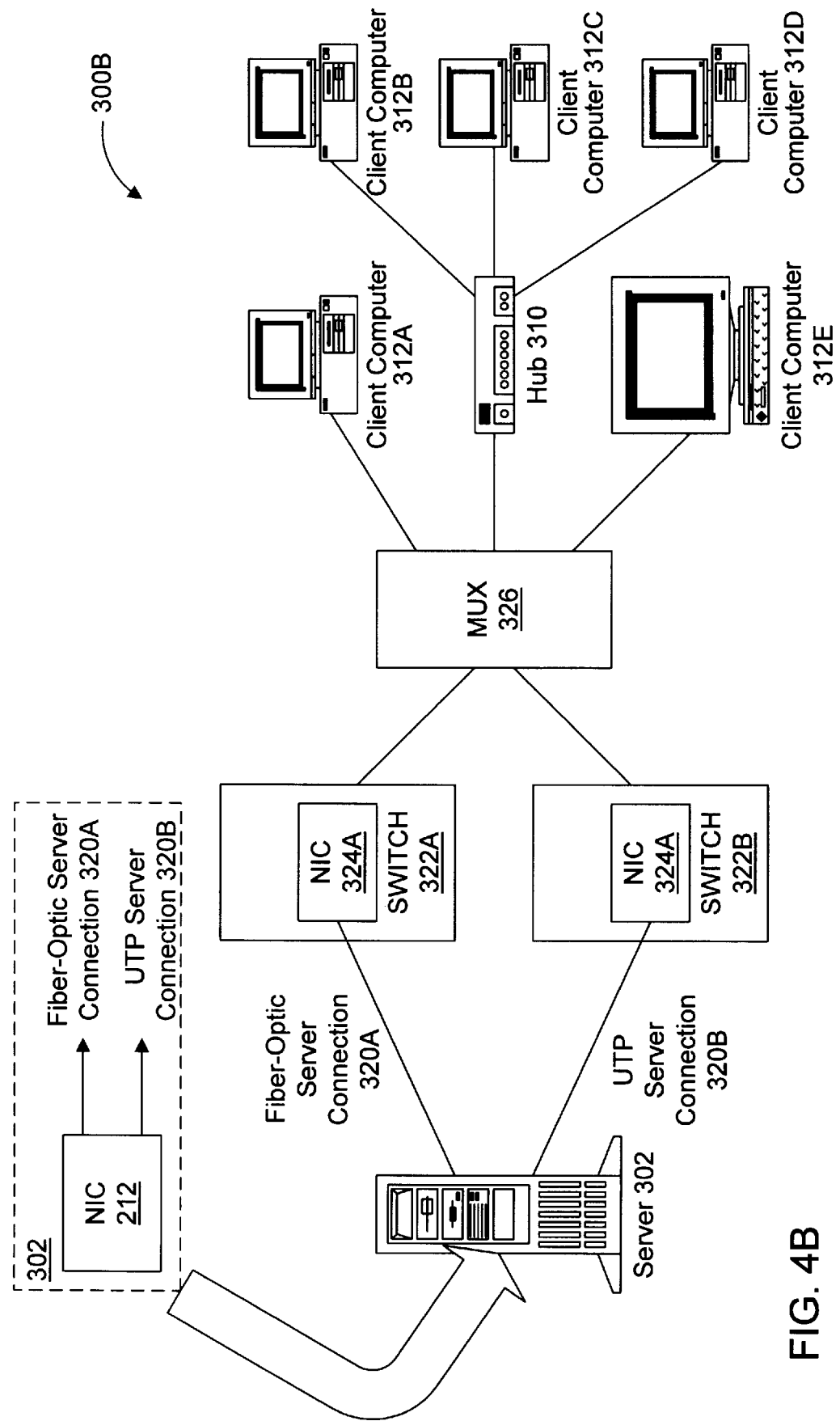

FIGS. 4A–B—LAN Configurations With Redundant Links

As described above, a network interface card according to the present invention (such as NIC 212 shown with reference to FIG. 3) may be utilized to provide two or more links between a computer system and a network. This allows the computer system to switch links if a currently selected link is detected to be down or unreliable. This is particularly useful in the case of migration into a newer technology transmission medium that may not be as reliable as an existing link. A network interface card configured according to one embodiment of the present invention allows dynamic switching of one link to a second link if a fault on the currently selected link is detected. This advantageously increases network flexibility and reliability. Many LAN configurations are possible using a network card according to one embodiment of the present invention. Two such configurations, LANs 300A–B, are shown below with reference to FIGS. 4A–B.

FIG. 4A depicts a LAN 300A. LAN 300A includes a server computer 302, which is coupled to a switch 306 via dual server connections 304A–B. Server computer 302 couples to these dual server connections 304 via a network interface card 212. Switch 306 also couples to dual server connection 304 via its own NIC. The NIC 212 within switch 306 couples, in turn, to switch hardware 308. Switch hardware 308 provides connectivity to the remainder of LAN 300A. Specifically, switch 306 couples to client computers 312 A–E and hub 310. Client computers 312A and 312E are directly connected to switch 306, while client computers 312B–D are coupled to switch 306 via hub 310.

In one embodiment, server connection 304A is the currently selected link within server 302. Accordingly, a given client computer 312 couples to server 302 over server connection 304A. This is accomplished by the given client computer 312 being selected by switch 306. Data is then transferred through switch hardware 308 to NIC 212, and then on to server computer 302. (Conversely, data can also be transmitted from server connection 304A through NIC 212 and switch hardware 308 to a given client computer 312).

If server connection 304A is detected to be unreliable, however, NIC 212 within server 302 may receive a command which instructs NIC 212 to deactivate server connection 304A and activate server connection 304B. In such a case, a switching procedure (described in greater detail below) is performed. This switching procedure has the effect of establishing a network link between server 302 and switch 306 over server connection 304B. Client computer 312A–E now couple to server computer 302 via this newly established connection.

Because NIC 212 within server 302 is configured to perform dynamic switching, the reliability of the LAN is not compromised. In fact, users of LAN 300A may not notice a loss in connectivity to server 302 (although if server connection 304B is slow relative to server connection 304A, a difference in latency may be noticed). Although prior art network interface cards also allow on-the-fly switching, network interface card 212 has the added advantage of being able to switch between links which include a fiber-optic interface (such as a SERDES device).

FIG. 4B illustrates a different LAN configuration, LAN 300B. LAN 300B increases the robustness of the configuration shown in FIG. 4A by including dual switches. As shown, LAN 300B includes a server computer 302 which is coupled to a plurality of switches 322. Server 302 is coupled to switch 322A by fiber-optic server connection 320A, while server 302 is coupled to switch 322B by UTP server connection 320B. Server 302 again includes a network interface card 212 according to one embodiment of the present invention, thus providing dual links over server connections 320A–B. Switches 322 each include a network interface card that supports only a single link. Switches 322A–B provide redundant paths between a switch 326, router 328, hub 327, and server 302. This provides increased system reliability as opposed to the configuration of LAN 300A shown above. If switch 306 of FIG. 4A fails, for example, the entire network is disabled. In the configuration of LAN 300B, however, the use of dual switches 322 allows total network operation even if one of the switches is not functioning. Consider the case in which client computer 312C is coupled to server computer 302 via hub 310, multiplexer unit 326, switch 322A and fiber-optic server connection 320A. If switch 322A becomes unreliable, server computer 302 can establish a new network link via UTP server connection 320B. Thus, communications can be restored to client computer 312C and server 302 by coupling to switch 322B, multiplexer unit 326 and hub 310.

In prior art systems, an on-the-fly switch cannot be performed between a fiber-optic connection and a copper connection (such as the unshielded twisted pair connection 320B shown in FIG. 4B). Network interface card 212, however, is configured to dynamically handle this type of link switch. A migration path using fiber-optic transmission media can thus be realized without compromising system reliability, efficiency and performance.

FIG. 5—Network Interface Card Block Diagram

Referring now to FIG. 5, a block diagram of NIC 212 is depicted. As shown, NIC 212 includes a media access controller (MAC) device 410, a select generation unit 414, a link switch 420, a SERDES PHY device 430, and a G/MII PHY device 440. MAC device 410 couples to computer system 200 via IO bus 214, and includes a physical layer (PHY) interface unit 412 for coupling to link switch 420. Select generation unit 414 generates a select signal 416, which is conveyed to physical interface unit 412 and link switch unit 420. As will be described below, select signal 416 is asserted in order to perform dynamic switching between physical layer devices 430 and 440. Link switch unit 420 couples to PHY devices 430 and 440 via a pair of transmit and receive buses.

SERDES PHY device 430 couples to a local-area network (such as LAN 300A or B) via a fiber-optic transmission medium (1000Base-X, for example). In contrast, G/MII PHY device 440 couples to LAN 300 via a copper transmission medium (such as 10/100Base-T). PHY devices 430 and 440 each have a different physical layer interface. Device 430 has a ten-bit interface (TBI), while device 440 has either a byte-wide or nibble-wide (GMII or Mul) interface. Moreover, the OSI reference model sublayers map differently into the SERDES and G/MII devices, further complicating the switching process. This difference in PHY interfaces is described next with reference to FIGS. 6A–C.

FIGS. 6A–C—OSI Sublayer Mappings for Different Ethernet Protocols

In the 10Base-T and 100Base-X protocols, PHY devices incorporate the physical medium attachment (PMA) and physical coding sublayer (PCS) and can interface to MAC device 410 via the nibble-wide MII. Similarly, 1000Base-T PHY devices also incorporate the PMA and PCS layers and can interface to MAC device 410 via the byte-wide GMII. In the 1000Base-X PHY device (SERDES), however, the PCS is not incorporated. Instead, the PCS for a SERDES device resides in a layer 2 device (the datalink layer) of the OSI model. Accordingly, IEEE 802.3z standard specifies a Ten-Bit Interface (TBI) that can be used between SERDES device 430 and MAC device 410.

The pins required for the Mul are a subset of the pins required for the GMII. Both MII and GMII use the same management interface pins, MDIO and MDC (discussed in greater detail below). The TBI is not related to either MII or GMII, but IEEE 802.3z specifies a mapping of the pins on the TBI to pins on the GMII and MII. Table 1 depicts this mapping.

TABLE 1

Pin Mapping

| MII | GMII | TBI |
|---|---|---|
| TX_ER | TX_ER | TX<9> |
| TX_EN | TX_EN | TX<8> |
|  | TXD<7:4> | TX<7:4> |
| TXD<3:0> | TXD<3:0> | TX<3:0> |
| RX_ER | RX_ER | RX<9> |
| RX_DV | RX_DV | RX<8> |
|  | RXD<7:4> | RX<7:4> |
| RXD<3:0> | RXD<3:0> | RX<3:0> |

Although the data and control pins on the MII, GMII and TBI can be mapped to equivalent pins, there are differences in how the MII and GMII pins operate in comparison to the TBI pins. For example, upon power-up, a SERDES device needs the PCS via the TBI to either auto-negotiate with its link partner or to transmit idle codes. The SERDES device requires the PCS to perform auto-negotiation. Thus, if the SERDES device is to be the selected interface, the TBI interface within NIC 212 is also active upon power-up.

If the TBI is active upon power-up, the MII and GMII, on the other hand, are inactive. However, since the PCS for these PHY devices are located internally, the PHYs themselves can perform auto-negotiation (or transmit idle codes). G/MII devices may thus establish a connection with a link partner even if they are not selected as the current network connection. A SERDES device, conversely, requires a continuous connection: either the SERDES is inactive or it is the currently selected network connection.

Because of the different properties of G/MII and SERDES devices, prior art devices have not been able to perform dynamic switching between the two interfaces. Instead, switching has been performed during power-up. While this simplifies the design of the network interface card, this does not provide a smooth migration path for a network user. For instance, such a design does not allow a user with an MII device (10BASE-T or 100BASE-X) to migrate to a TBI device (1000Base-X). A network interface card according to one embodiment of the present invention, however, allows such a migration path.

Figure 7:
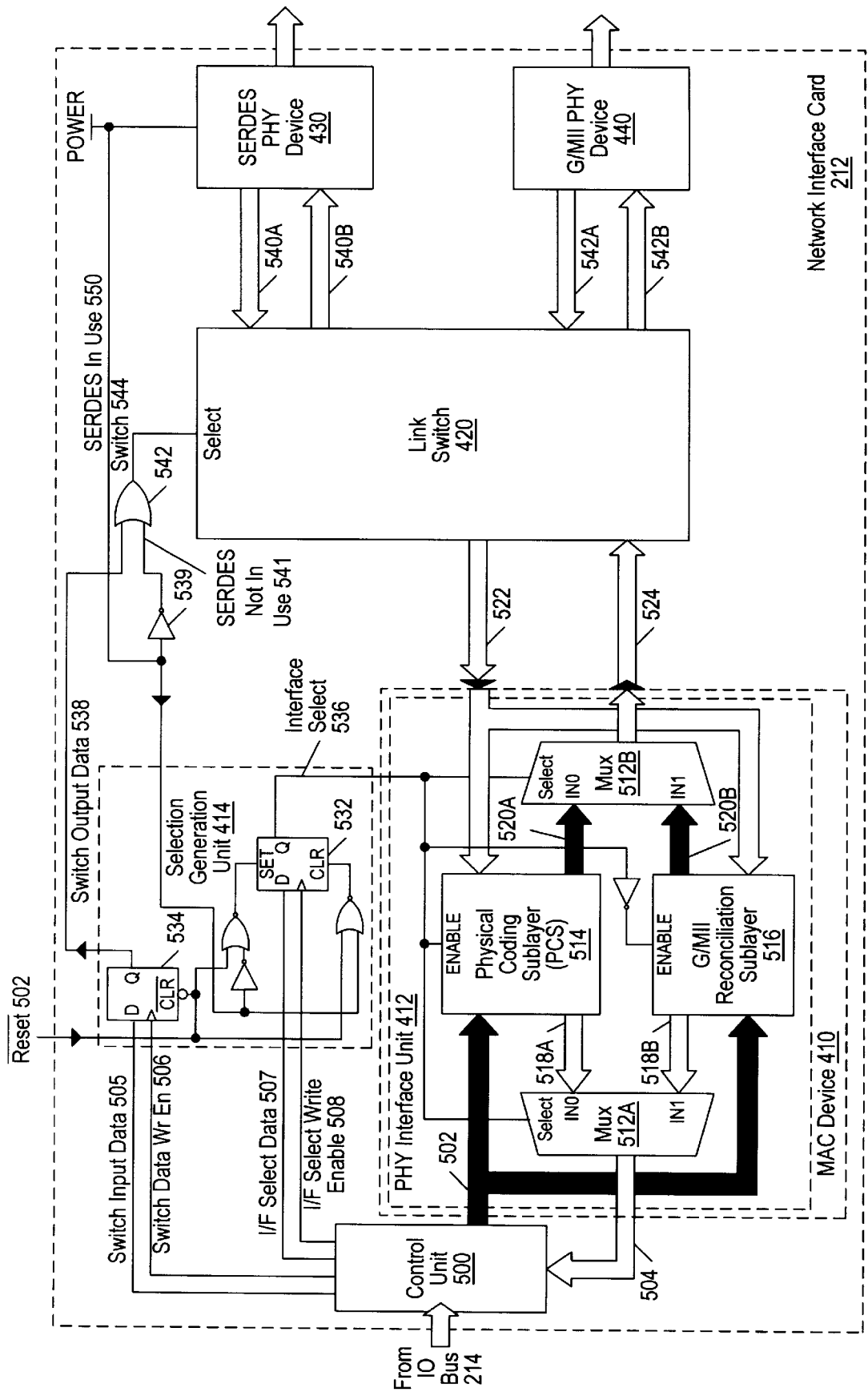
FIG. 7 is a more detailed block diagram of network interface card 312 depicted in FIG. 4 according to one embodiment of the present invention.

FIG. 7—Detailed Network Interface Card Block Diagram

FIG. 7 depicts a more detailed block diagram of NIC 212. FIG. 7 includes a number of elements depicted above with reference to FIG. 5: PHY interface unit 412, select generation unit 414, link switching unit 420, SERDES PHY device 430, and G/MII PHY device 440. As shown, NIC 212 also includes a control unit 500, which couples to IO bus 214.

As shown, control unit 500 is configured to generate four control signals for conveyance to select generation unit 414: switch data input signal 505, switch write enable signal 506, interface select data 507, and interface select write enable 508. Control unit 500 also provides a data path between IO bus 214 and physical interface unit 412. Control unit 500 provides input data to unit 412 via control-interface input bus 502, while control unit 500 receives input data from unit 412 on interface-control output bus 504.

Select generation unit 414 generates the signals utilized to switch the proper physical layer interface as well as the physical layer device itself. Switch output data signal 538, which controls the switching of link switching unit 420, is generated by flip-flop 534 in response to inputs switch input data signal 505 and switch data write enable signal 506. Interface select signal 536, which enables the appropriate physical layer interface, is generated by flip-flop 534 in response to inputs interface select data 507 and interface select write enable 508. The initial state of output signals 536 and 538 is determined after reset signal 502 is de-asserted (according to whether SERDES device 430 is powered-up as indicated by SERDES in use signal 550).

Physical interface unit 412 includes a corresponding sublayer unit for each of the types of attached PHY devices. Physical Coding Sublayer 514 corresponds to the MAC interface for SERDES PHY 430, while Reconciliation sublayer 516 corresponds to the MAC interface for G/MII devices. Sublayers 514 and 516 share a common interface to control unit 500: control-interface input bus 502. Thus, when control unit 500 receives PHY input data from bus 214, this data is conveyed on bus 502 to both sublayer 514 and sublayer 516. Only one sublayer at a time is active, however, based on the state of interface select signal 536. In the embodiment shown, a '1' value causes sublayer 514 to be enabled, while a '0' value on signal 536 enables sublayer 516.

The enabled sublayer (514 or 516) processes the input data received on bus 502 and conveys output data on a corresponding bus 520. (Sublayer 514 conveys output data on first PCS output bus 520A, while sublayer 516 conveys output data on first reconciliation sublayer output bus 52013). The data on buses 520A–B is conveyed to output multiplexer 512B. Output multiplexer 512B provides an input data path (link switch input bus 524) between PHY interface unit 412 and link switching unit 420. The output of multiplexer 512B is also selected by the state of interface select signal 536.

Link switch output bus 522 provides an output data path from link switching unit 420 to physical interface unit 412. Bus 522, like bus 502, couples to both sublayer 514 (SERDES) and sublayer 516 (G/MII). The active sublayer (determined by signal 536) then processes the input data from bus 522, and conveys corresponding output data on a corresponding bus 518. (Sublayer 514 conveys output data on first PCS output bus 518A, while sublayer 516 conveys output data on first reconciliation sublayer output bus 518B). The data from both buses 518 is conveyed to an output multiplexer 512A, which conveys its output data on interface-control output bus 504 to control unit 500. Like multiplexer 512B, multiplexer 512A conveys output data based on the state of interface select signal 536.

Link switching unit 420 provides a data path between physical interface unit 412 and PHY devices 430 and 440 according to the state of switch signal 544. Switch signal 544 is generated by OR gate 542 in response to inputs switch data output signal 538 and SERDES not in use signal 541, which is generated by inverter 539 from SERDES in use signal 550. In the embodiment shown, link switching unit 420 is configured to switch to SERDES PHY 430 in response to switch signal 544 being equal to '0'. Conversely, when signal 544 is '1', unit 420 switches to G/MII PHY 440. Many other embodiments of NIC 212 are possible in which link switching unit 420 is controlled in alternate manners.

Table 1 shown above depicts the common pins between the MII, GMII, and TBI. The common output pins are conveyed on link switch input bus 524 to link switching unit 420. The routing of these signals within unit 420 is described below with reference to FIG. 8A.

There are some pins, however, that are present in the G/MII which are not present in the TBI. These G/MII-only pins are therefore directly connected (through unit 420) between physical interface unit 412 and G/MII PHY 440 at all times. For example, the G/MII PHY input signal GTX-CLK is connected directly from unit 412 to G/MII PHY 440. GTXCLK is part of link switch input bus 524 and G/MII input bus 542B. Similarly, G/MII PHY output signal TXCLK is not switched by unit 420 either. TXCLK is part of G/MII output bus 542A and link switch output bus 522. There are also several SERDES signals that are shared.

Figure 8A:
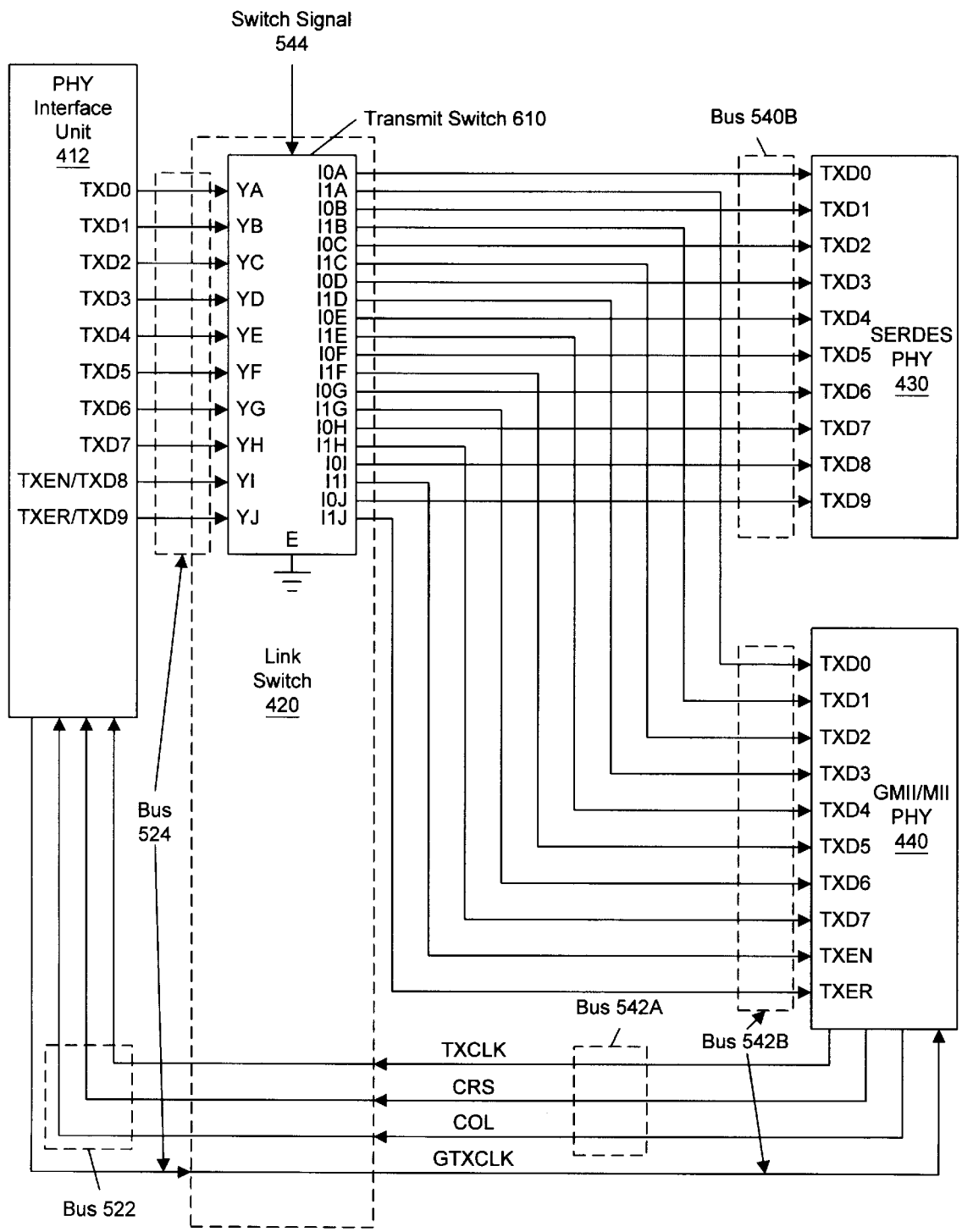
FIGS. 8A–B are block diagrams of the interface to the link switch unit depicted in FIG. 5 according to one embodiment of the present invention.
Figure 8B:
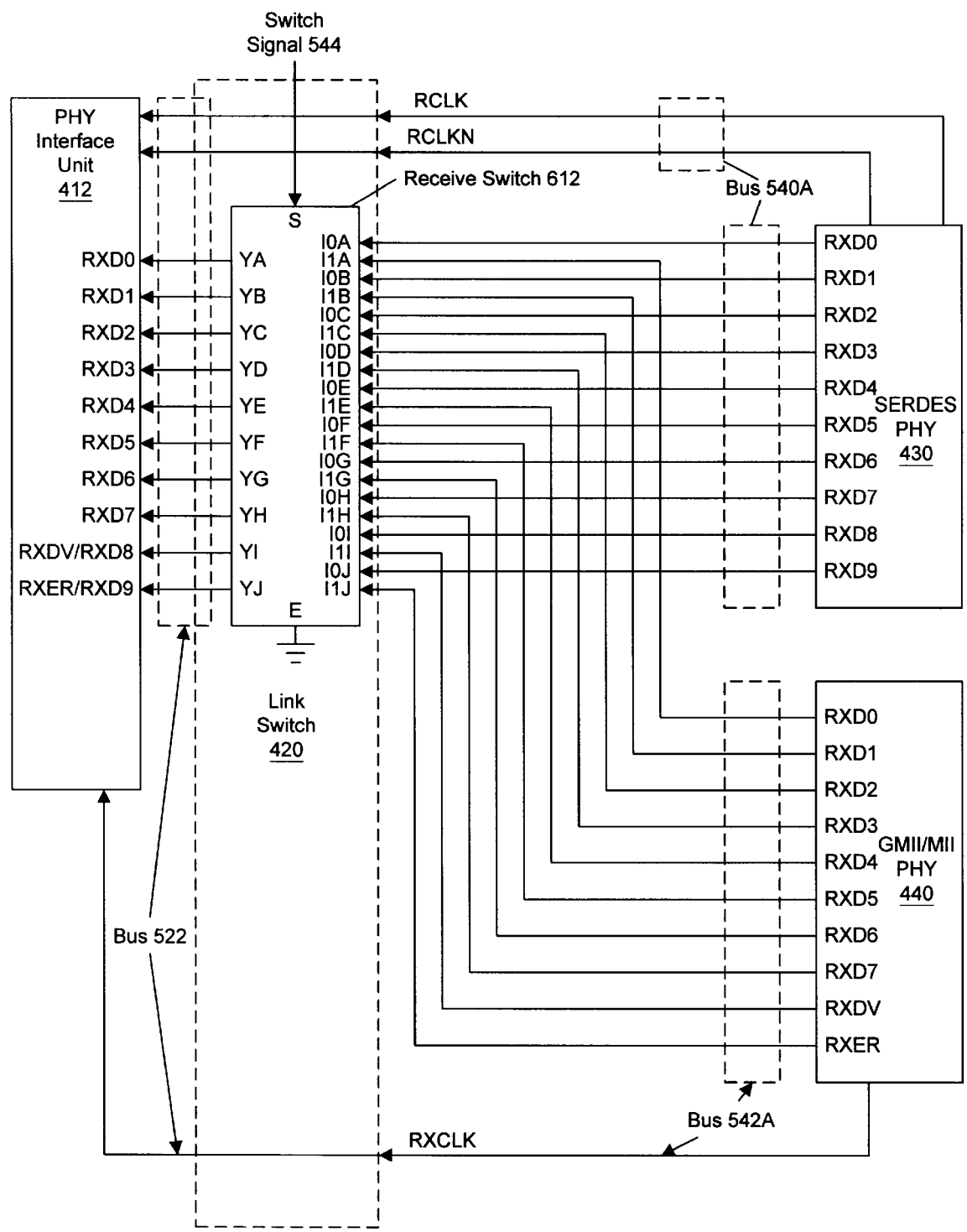

FIGS. 8A–8B—Link Switching Unit

As described above, link switching unit 420 couples the current selected PHY (as determined by the value of switch signal 544) to physical layer interface unit 412. In one embodiment, link switching unit 420 includes a transmit data path (from unit 412 to PHYs 430 and 440) and a receive data path (from PHYs 430 and 440 to unit 412). FIG. 8A depicts the transmit data path, while FIG. 8B depicts the receive data path.

As shown in FIG. 8A, the transmit data path includes link switch input bus 524 conveyed from physical layer interface unit 412. Bus 524 includes all the component transmit signals of the Ten-Bit Interface (TXD0–9), along with other G/MII-specific signals. Note that several of the G/MII defined signals are mapped onto TBI-defined signals. For example, G/MII signal TX_ER and TXD8 are conveyed on the same signal of bus 524, depending upon which interface is enabled.

The commonly shared signals of bus 524 are conveyed to a transmit switch 610 within link switching unit 420. In a preferred embodiment, transmit switch 610 (and receive switch 612 described below) are implemented with a high-speed switch which exhibits minimum-to-zero propagation delay and ground bounce, while still providing adequate drive capability. In one embodiment, the QS33X257 Quick-Switch from Quality Semiconductor is utilized for switches 610 and 612.

As shown, transmit switch 610 receives switch signal 544. As described above, in one embodiment, if switch signal 544 is a '0', transmit switch 610 conveys shared input bus 524 signals on SERDES PHY input bus 540B (also denoted as bus IOA–J at switch 610 outputs). Conversely, if switch signal 544 is a '1', transmit switch 610 conveys shared input bus 524 signals on G/MII PHY input bus 542B (switch outputs IIA–J). The G/MII-specific signal are conveyed directly to PHY 440 using the non-shared portions of buses 522, 524, 542A, and 542B.

As shown in FIG. 8B, the receive data path includes SERDES output bus 540A and G/MII PHY output bus 542A conveyed to link switch unit 420. Buses 540A and 542A represent the common signals which are switched by receive switch 612. Bus 540A includes all the component receive signals of the Ten-Bit Interface (RXD0–9). Bus 542 includes several G/MII-specific receive path signals in addition to the shared signals.

Receive switch 612 receives switch signal 544 in the same manner as transmit switch 610. If switch signal 544 is a '0', receive switch 612 conveys input bus 540A signals from SERDES PHY 430 to PHY interface unit 412 on link switch input bus 522. The SERDES specific signals are conveyed directly to unit 412 on non-shared portions of buses 540A and 522. Conversely, if switch signal 544 is a '1', receive switch 612 conveys input bus 542B signals from G/MII PHY 440 to PHY interface unit 412 on bus 522. The G/MII-specific signals are conveyed directly to unit 412 40 using non-shared portions of buses 542A and 522.

Figure 9:
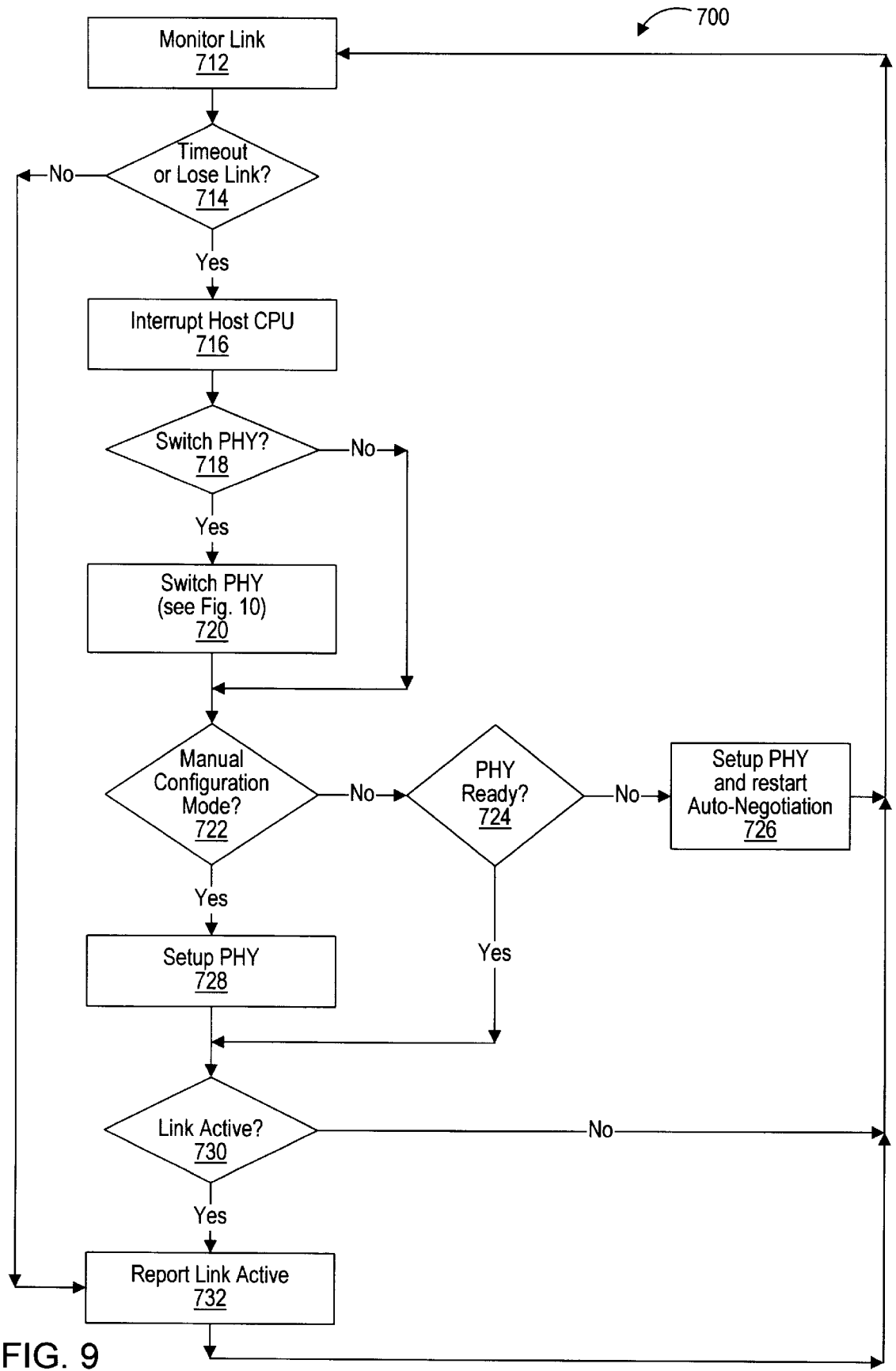
FIG. 9 is a high-level flowchart describing the monitoring operations of network interface card 312 according to one embodiment of the present invention.

FIG. 9—System-Level Flowchart

FIG. 9 depicts a method 700 which describes the overall operation of computer system 200 with regard to detection of network link status. Generally speaking, method 700 may be generalized into two parts. In the first part of method 700, the link is monitored in step 712. If a timeout or lost link is reported, a series of steps (714–732) are taken to correct the potential fault.

Method 700 begins with step 712, in which the status of the link is monitored. Link monitoring may be performed in a variety of ways. One common way is for host CPU 202 to poll a status register in the currently established physical layer device at a predetermined interval. A link monitoring method which uses auto-polling to advantageously free up CPU bandwidth may also be employed. This process is described below with reference to FIGS. 11–14.

Regardless of the monitoring method employed in step 712, the polling process periodically checks the link status. This operation is represented by step 714 in method 700. If no fault is detected, the link is reported active in step 732. Method 700 then returns to step 712 and the monitoring process resumes.

If, however, the link has a potential fault, method 700 proceeds to step 716. In this step, host CPU 202 receives an interrupt to indicate that the current link is possibly faulty. Next, in step 718, a determination is made by host CPU 202 of whether or not to perform a link switch. To this end, CPU 202 may consult a previously generated table which indicates if other PHYs are available for switching.

If it is determined in step 718 that a link switch is to be performed, method 700 proceeds to step 720, in which the switch operation is effectuated. This process is described in greater detail with reference to method 800 in FIG. 10. After the switch operation in step 720 completes, method 700 proceeds to step 722. If it is determined in step 718 that a link switch is not to be performed, method 700 proceeds directly to 722.

In step 722, it is known that an interrupt has previously been generated due to a link timeout or status mismatch. This interrupt condition may have caused a link switch (execution of step 720) or the previous link may still be selected (having bypassed step 720). In either case, the currently selected link (whether new or old) is reconfigured starting in step 722.

In step 722, a determination is made as to whether the link is to be brought in manual configuration mode or by auto-negotiation. In manual configuration mode, link parameters are specified by host CPU 202, while auto-negotiation mode allows link partners to perform automatic configuration of an established link. This determination is typically made by querying a bit (or variable) set in the network driver being executed by host CPU 202.

If the driver settings indicate that manual configuration mode is desired, method 700 proceeds to step 728. In step 728, manual configuration is performed, with host CPU specifying parameters such as line and wire speed. Next, in step 730, a determination is made as to whether the link is active. If activity is detected, this is noted in step 732. Execution of method 700 then continues with monitoring of the link in step 712. If the link is determined to be inactive in step 730, method 700 proceeds directly to step 712, with the link being monitored to check for a timeout or fault condition (which 27 If or example, if the link cannot be properly established).

If the driver settings indicate that auto-negotiation is desired, method 700 proceeds from step 722 to step 724. In step 724, a determination is made as to whether the physical device being configured is ready (that is, it has completed auto-negotiation). If auto-negotiation has completed, method 700 advances to step 730 to check to see if the link is active. If so, this activity is reported in step 732 and method 700 returns to step 712. If the link is inactive, method 700 proceeds directly to step 712 from step 730.

If it is determined in step 724 that the PHY being configured has not completed auto-negotiation, a setup procedure is performed in step 726. Furthermore, the auto-negotiation process is restarted. Method 700 then returns to step 712. When the auto-negotiation process completes, a CPU interrupt will be generated which indicates that the link is now active.

Method 700 thus provides a continuous process for monitoring and switching network links in computer system 200 using network interface card 212.

Figure 10:
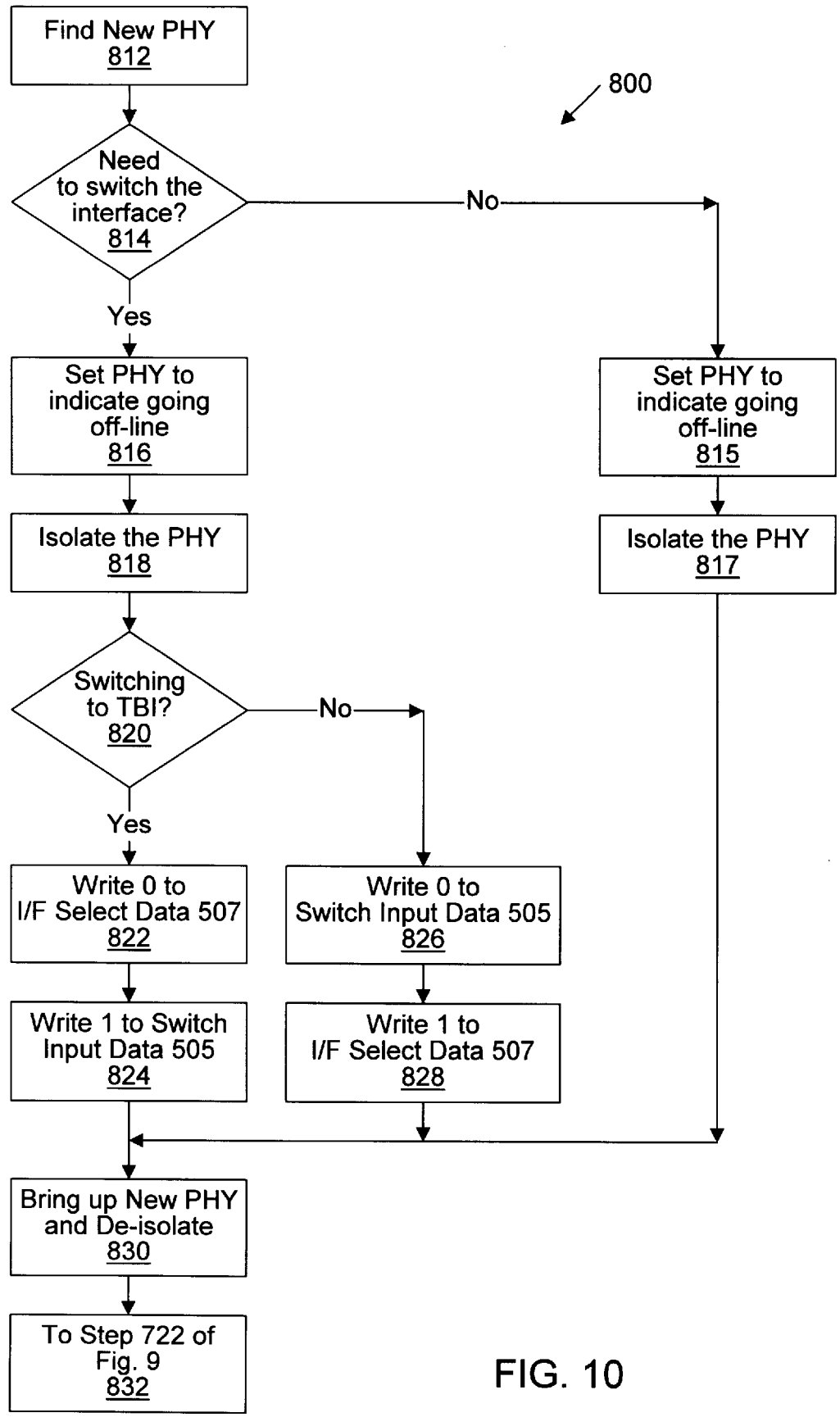
FIG. 10 is a flowchart of the link switch operation performed by network interface card 312 according to one embodiment of the present invention.

FIG. 10—Dynamic Switching Process

Referring now to FIG. 10, a method 800 is depicted which illustrates the switching procedures between two network links coupled to a network interface card such as NIC 212. As described above, method 800 corresponds to step 720 of FIG. 9. Method 800 handles both switching from the TBI to the G/IIM, as well as switching from the G/MII to the TBI. Unlike prior art designs, this switching process (TBI to G/MII or vice-versa) may be accomplished without having to power-down the system.

Method 800 commences with step 812, in which a new PHY is selected from a previously generated table in the network driver which lists available PHYs. With a new PHY selected, a determination is made in step 814 as to whether an interface switch is to be performed. In the context of step 814, "interface switch" refers to a switch from SERDES to GIMII or vice-versa. Switching from one G/MII device to another G/MII device is not considered an interface switch for the purposes of step 814.

If an interface switch is determined not be performed in step 814, method 800 proceeds to step 815, in which an indication is given that the currently selected PHY is about to go off-line. This allows current link partners to properly terminate the link connection. Next, the current PHY is isolated in step 817. In one embodiment, isolation is performed by writing to a control register within the PHY. Execution of step 817 effectively terminates the current link.

With the current link terminated in step 817, method 800 continues with step 830. In step 830, the new PHY (previously selected in step 812) is configured and de-isolated. At the conclusion of step 830, the switching process is complete. Method 800 continues with step 832, which returns to step 722 of method 700.

If a determination is made in step 814 that an interface switch is to be performed, method 800 continues with steps 816 and 818. These steps are identical to steps 815 and 817 described above. At the conclusion of step 818, the current network connection is terminated. If the switch operation of method 800 is from TBI to G/MII, physical coding sublayer 514 is effectively isolated in step 818 from both the MUX 512A and the control unit 500.

In step 820, a determination is made of the whether the switch is from TBI to G/MII or vice-versa. If the switch is to a SERDES PHY, method 800 proceeds to step 822, in which a '1' value is written to interface select data signal 507 by control unit 500. In turn, interface select signal 536 becomes a '1', which causes sublayer 514 to be selected and sublayer 516 to be de-selected within physical layer interface unit 412. Next, in step 824, a '0' value is written to switch input data signal 505 by control unit 500. This causes switch output data signal 538 to become a '0', which, as described above, causes link switching unit 420 to switch from G/MII PHY 440 to SERDES PHY 430. The SERDES PHY is configured and de-isolated in step 830. Method 800 then returns to step 722 of method 700 via step 832.

If the switch is determined to be to a G/MII PHY in step 820, method 800 proceeds to step 826, in which a '1' value is written to switch input data signal 505 by control unit 500. This causes link switching unit 420 to begin transmitting and receiving data to G/MII PHY 440. Next, control unit 500 writes a '0' value to interface select data signal 507. This causes sublayer 516 to be selected and sublayer 514 to be de-selected within unit 412. The G/MII PHY is configured and de-isolated in step 830. Method 800 then returns to step 722 of method 700 via step 832.

It is noted that although only a single G/MII device is shown in the preceding figures, a plurality of such devices may be used in other embodiments of NIC 212. Thus, the network interface card is also operable to switch between a SERDES device and a plurality of G/MII PHYs.

Figure 11:
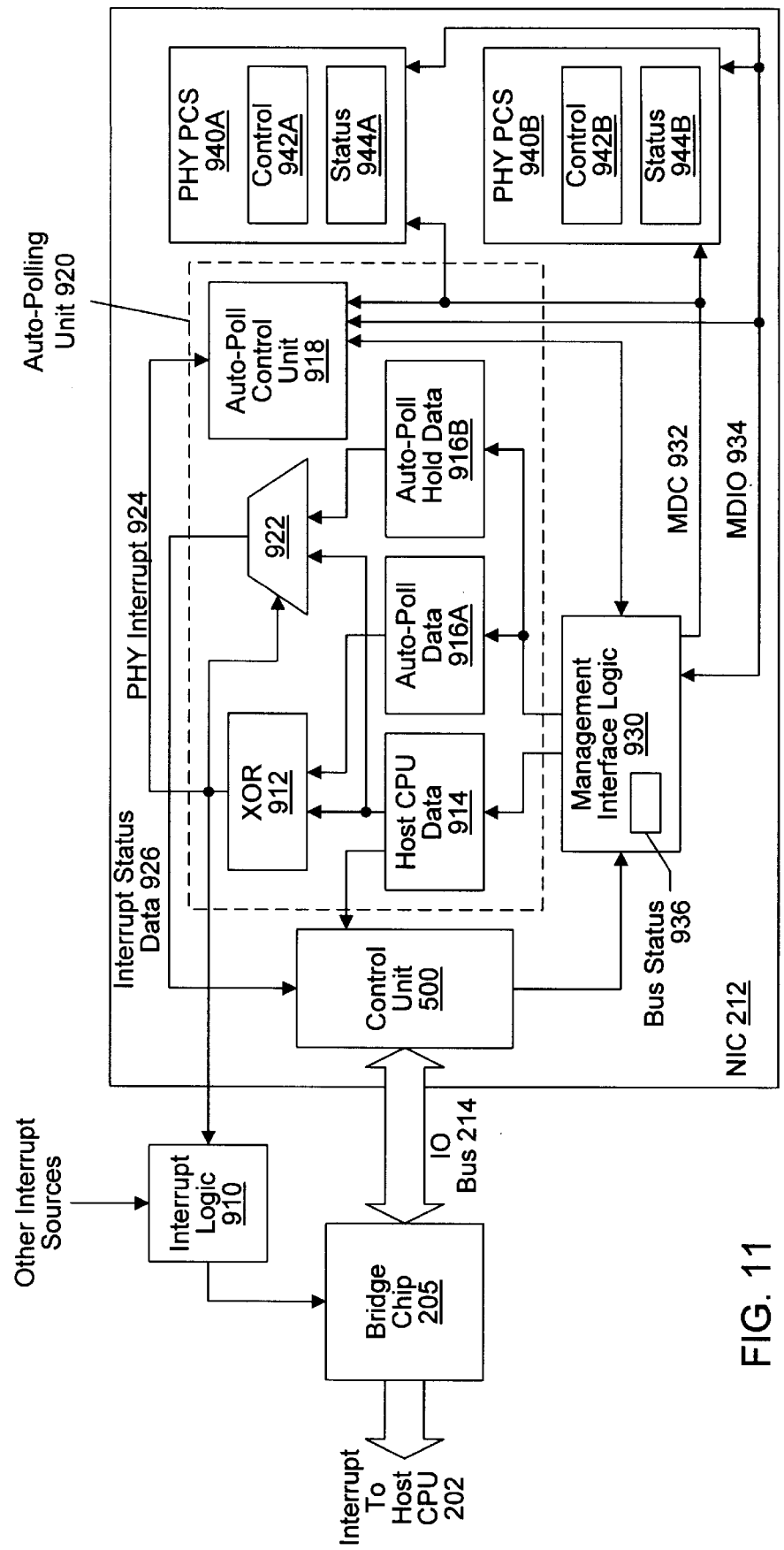
FIG. 11 is a block diagram of a network interface card which includes an auto-polling unit according to one embodiment of the present invention.

FIG. 11—Auto-polling Unit

As described above with reference to step 712 of method 700, there are various methods for monitoring the status of an established network link. One commonly practiced procedure is to have a CPU (such as host CPU 202) repeatedly poll a status register within the physical interface layer (such as the PCS) of a PHY device in order to determine if an interrupt condition has occurred. While functional, this procedure can cause a drain on CPU bandwidth. A more efficient process for interrupt detection (auto-polling) is described below with reference to FIGS. 11–14. It is noted that the auto-polling technique described herein may be used in conjunction with or independently from the dynamic switching technique described above.

FIG. 11 is a block diagram depicting portions of computer system 200, specifically portions of network interface card 212. As shown, NIC 212 includes control unit 500, which couples to bridge chip 205 via IO bus 214. NIC 212 further includes an auto-polling unit 920, a management interface logic unit 930, and one or more PHY interface devices 940 (two are shown in FIG. 11 for purposes of illustration). Note that each of interface devices 940 may be internal to the actual PHY device (in the case of a G/MII PHY) or external (such as for a SERDES PHY, in which the status registers are located within interface unit 412, for example).

Each of sublayers 940 includes a control register 942 and a status register 944. Host CPU 202 is configured to perform writes to a control register of the currently selected PHY in order to change the operating state of the device. For example, the control register for PHY devices has bits corresponding to reset, power-down, and isolation modes. These bits may be set accordingly as needed to achieve a desired state.

The status registers 944A–B of sublayers 940 include information which specifies the current state of the link. For example, status register specified for G/MII PHYs include a variety of bits which may change during operation of the link. Bit 5 of the status register indicates whether auto-negotiation functionality has completed. Bit 4 indicates the presence of a remote fault in auto-negotiation capable PHY devices. Bit 2 indicates the link status. Bit 1 indicates that jabber has been detected on the link.

The interface to the control and status registers of the PHY device is referred to as the "management interface". As used herein, a "management interface" is an interface over which control and data values governing device operation are transmitted. The PHY management interface is defined by IEEE standard 802.3u, clause 22, to be two-wire interface: a clock signal MDC and a bi-directional data line MDIO. These signals (represented by reference numerals 932 and 934) couple management interface logic unit 930 and each of sublayers 940.

In order to write one of control registers 942, host CPU conveys data to control unit 500 via IO bus 214. The control value is then conveyed to management interface logic unit 930 via bus 938. The new control value is then written to the desired control register 942 via serial data line 934. During this access, bus status 936 is set to indicate that host CPU is utilizing the management interface. (As will be described below, auto-polling unit 920 may also utilize the management interface. During such accesses, bus status 936 is set accordingly. Unit 920, however, cannot utilize the management interface if bus status 936 indicates that the CPU is already using the interface.) The host CPU also performs reads of status registers 944 via the management interface. When a status value is accessed from a register 944, the value is stored in host CPU data register 914 for subsequent use. Note that the status value read from one of registers 944 is conveyed to the host CPU via multiplexer 922, which selects the input from register 914 as its output unless interrupt signal 924 is asserted.

As shown, auto-polling unit 920 includes a host CPU data register 914, an auto-poll data register 916A, an auto-poll hold data register 916B, an auto-poll control unit 918, an interrupt status data multiplexer 922, and a comparator (bit XOR) 912. Operation of auto-polling unit 920 is governed according to an auto-polling state machine described below with reference to FIG. 12. Generally speaking, auto-polling unit 920 monitors activity on MDIO signal 934. If no activity is detected for a predetermined number of MDC cycles, auto-polling unit 920 takes control of the management interface and queries the status register of the currently selected PHY device. If a difference is detected between the current status value and the previous status value read by host CPU 202, an interrupt is generated on PHY interrupt signal 924. This interrupt is conveyed to CPU 202 via interrupt logic 910.

Figure 12:
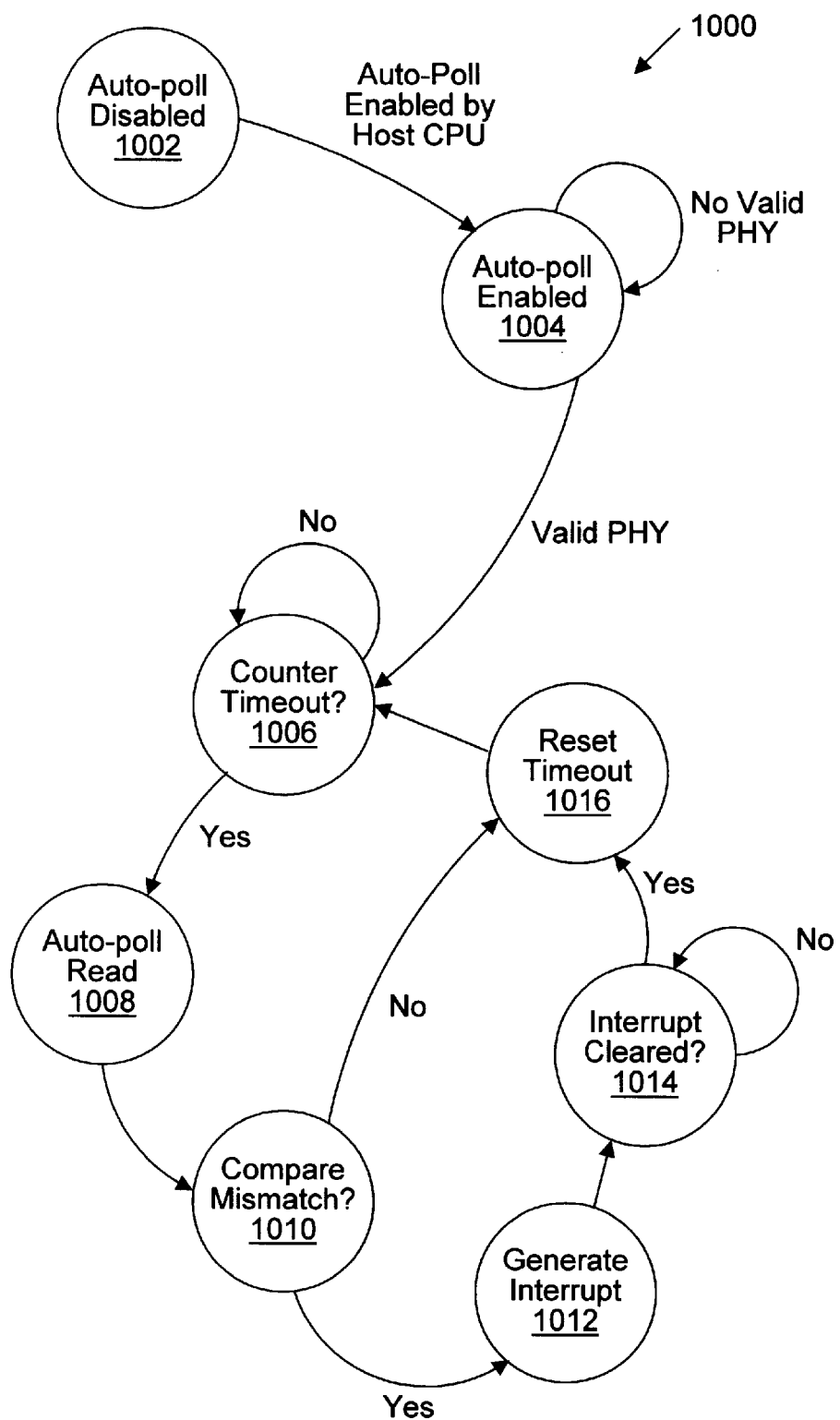
FIG. 12 is a state machine which illustrates operation of an auto-polling unit according to one embodiment of the present invention.
Figure 13:
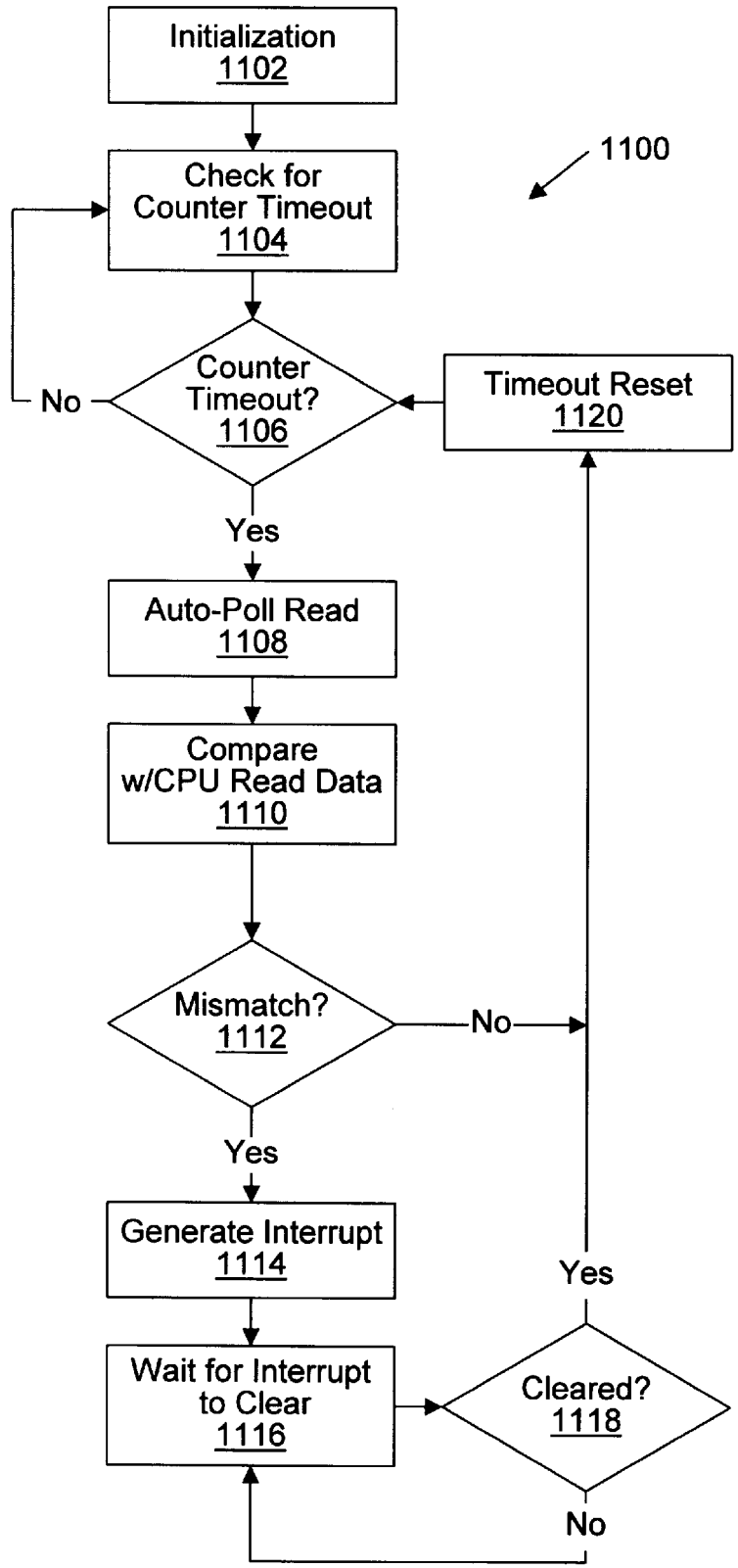
FIG. 13 is a flowchart which depicts the flow of the auto-poll operation according to one embodiment of the present invention.

FIGS. 12–13—Operation of Auto-polling Unit

Referring now to FIG. 12, a state machine 1000 is depicted which describes operation of auto-polling unit 920 shown in FIG. 11. The start state of state machine is 1002, in which the auto-polling feature is disabled. State machine 1000 remains in state 1002 until such time as auto-polling is enabled by host CPU 202 (causing a transition to state 1004).

State machine 1000 remains in state 1004 until host CPU 202 performs one or more writes which cause a particular PHY to become active. (Specifically, these writes remove the PHY from reset, power-down, and isolation modes). When host CPU 202 begins writing a PHY, auto-polling unit 920 is able to determine the address of the PHY device that it will eventually poll. Auto-polling does not begin, however, until the PHY is valid.

When a PHY is valid, state machine 1000 transitions to state 1006. Auto-polling control unit 918 begins monitoring activity on the management interface of the currently selected PHY. The state machine remains in state 1006 until a counter timeout is detected. In a preferred embodiment of the invention, this counter timeout corresponds to 32 clock cycles on MDC 932 during which there is no activity on MDIO 934. In another embodiment of the invention, the timeout may be adjusted by host CPU 202 as desired.

When a counter timeout is detected in state 1006, state machine 1000 transitions to state 1008, in which an auto-poll read operation is performed. This involves auto-polling unit 920 accessing the status register 944 of the currently selected PHY device via the management interface. As part of this process, auto-polling unit 920 sets bus status 936 to indicate that the management interface is currently not available to the host CPU but holds the request of the host CPU. (Likewise, when bus status 936 indicates that host CPU is utilizing the management interface, auto-polling unit 920 is inhibited from accessing status registers 944).

The value read from the status register 944 of the currently selected PHY device is conveyed to auto-poll registers 916A–B via management interface logic unit 930. The contents of auto-poll data register 916A are then conveyed to comparator 912, which also receives the contents of host CPU data register 914. As described above, register 914 includes the most recent status register value read by the host CPU.

After the auto-poll read of state 1008, comparator 912 performs a comparison of the current status value (from register 916A) and the most recent status value read by the host CPU. If there is a mismatch detected between the two values in state 1010, state machine 1000 generates an interrupt to the host CPU in state 1012 via PHY interrupt signal 924. The state machine then proceeds to state 1014, where it remains until interrupt signal 924 is cleared.

The host CPU responds to the assertion of interrupt signal 924 by requesting a read of the status register data which caused the interrupt. This data is conveyed to the host CPU from auto-poll hold data register 916B via multiplexer 922. The read request by the CPU also causes registers 914 and 916A to update the same value. This, in turn, has the effect of de-asserting interrupt signal 924, since the two inputs to comparator 912 are now equal.

When interrupt signal 924 is de-asserted, state machine 1000 transitions from state 1014 to state 1016. This state resets the counter timeout and returns to monitoring state 1006. In this manner, auto-polling is disabled while interrupt signal 924 is asserted.

Operation of state machine 1000 continues as described above until auto-polling is disabled. It is noted that the above described auto-polling process is compatible with any PHY device which incorporates the IEEE standard 802.3u, clause 22, management interface. The process is compatible since MDIO and MDC are not utilized in any non-standard manner.

FIG. 13 presents the operation of auto-polling unit 920 in flowchart format.

Figure 14:
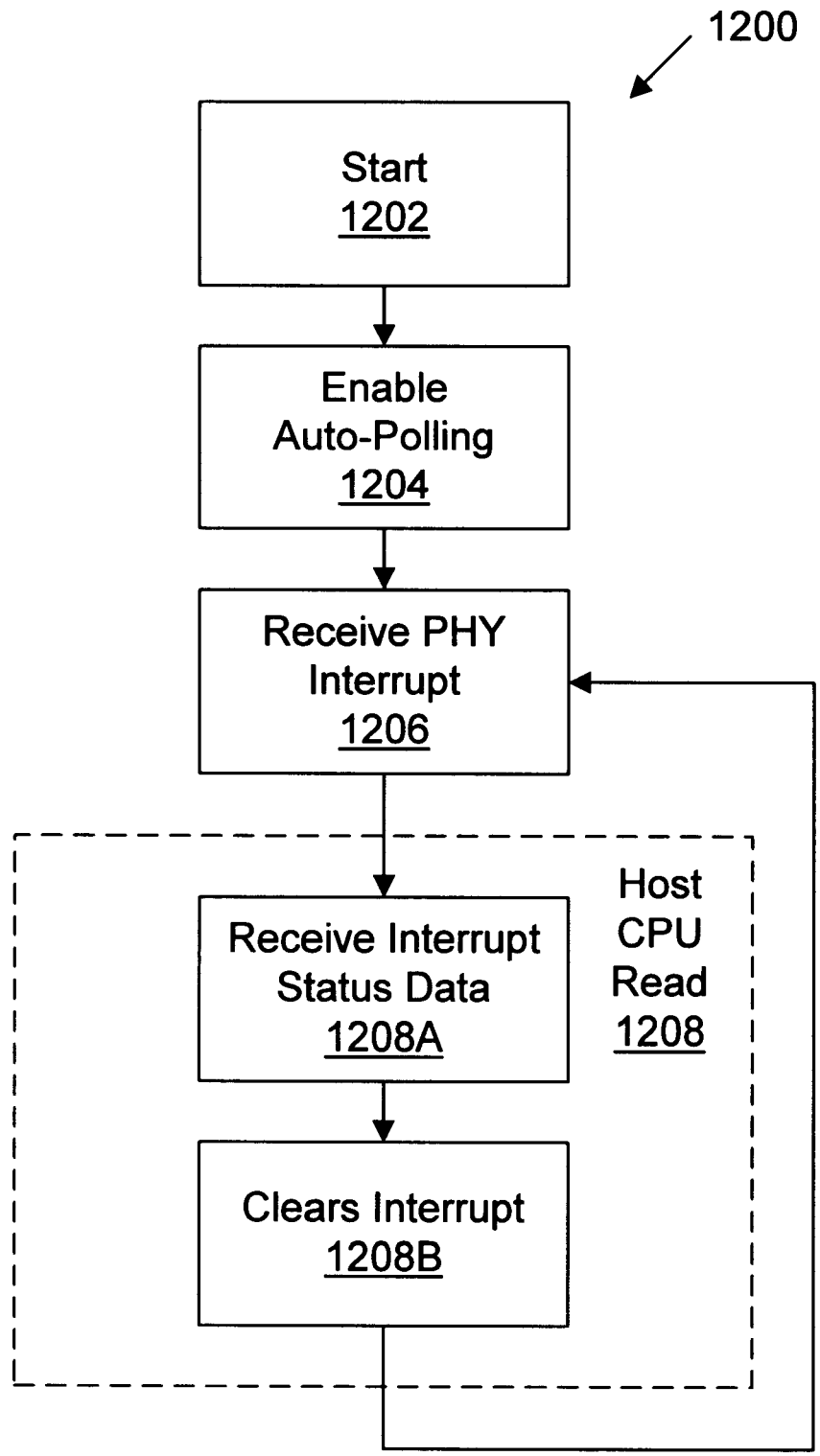
FIG. 14 is a flowchart depicting the operation of the host CPU during auto-polling according to one embodiment of the present invention.

FIG. 14—Host CPU Operation During Auto-Polling

Referring now to FIG. 14, a method 1200 is depicted which illustrates the operation of a host CPU such as CPU 202 during the auto-polling procedure. Method 1200 commences with an initial step 1202. During initialization, method 1200 proceeds to step 1204, in which auto-polling is enabled. In one embodiment, auto-polling is enabled when a valid PHY is discovered.

With auto-polling enabled, the host CPU no longer has to continually monitor the PHY status registers to check for an interrupt. Instead, auto-polling unit 920 informs the host CPU when a PHY interrupt has been generated. This has the desirable effect of reducing CPU overhead.

When the host CPU receives a PHY interrupt on signal 924, method 1200 proceeds to step 1208, in which the host CPU performs a read operation. In one embodiment, step 1208 includes sub-steps 1208A–B.

In sub-step 1208A, the host CPU receives the data the caused the interrupt. As described above, this data is conveyed to the CPU via register 916B and interrupt status register data bus 926. Next, in sub-step 1208B, the host CPU performs a read operation which causes interrupt signal 924 to be de-asserted. This is performed in one embodiment by updating the contents of registers 914 and 916B to the same value. With the PHY interrupt cleared, method 1200 returns to step 1206.

Although the auto-polling process described above was described as part of a network interface card, this process may be utilized by any device that wants to monitor the status of a PHY without over-burdening the CPU. Furthermore, the process can be expanded to monitor a larger set of registers. In an alternate embodiment, the host CPU can select one or more registers to auto-poll. Still further, the counter timeout may also be adjusted as needed by the CPU. This delay could be set to a fixed value if desired. In another embodiment, the delay could be set as needed by the host CPU.

Although the system and method of the present invention have been described in connection with the described embodiments, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A computer system, comprising:
    a host CPU;
    an IO interface device coupled to said computer system via a management interface;
    an auto-polling unit configured to monitor activity on said management interface, wherein said auto-polling unit is configured to read a first status value from a status register within said 10 interface device in response to detecting a lack of activity on said management interface over a predetermined interval;
    wherein said auto-polling unit is further configured to compare said first status value to a second status value, wherein said second status value is a most recent status value read by said host CPU from said status register;
    wherein said auto-polling unit is configured to generate an interrupt to said host CPU in response to detecting a mismatch between said first status value and said second status value.

2. The computer system of claim 1, wherein said auto-polling unit includes a host CPU data register configured to store said most recent status value read by said host CPU from said status register, wherein said host CPU data register is configured to store said second status value.

3. The computer system of claim 2, wherein said auto-polling unit includes an auto-poll data register configured to store a most recent status value read by said auto-polling unit from said status register, wherein said auto-poll data register is configured to store said first status value.

4. The computer system of claim 3, wherein said auto-polling unit includes a comparator coupled to receive current values from said host CPU data register and said auto-poll data register, wherein said comparator is configured to perform a comparison between said current values from said host CPU data register and said auto-poll data register, wherein said comparator is configured to generate said interrupt in response to detecting a mismatch between said current values from said host CPU data register and said auto-poll data register.

5. The computer system of claim 1, wherein said host CPU is configured to perform a request for a read of said status register in response to receiving said interrupt, wherein said auto-polling unit is configured to convey said first status value to said host CPU in response to said request.

6. The computer system of claim 5, wherein said auto-polling unit is configured to clear said interrupt in response to said host CPU performing said request.

7. The computer system of claim 1, wherein said predetermined interval is variable.

8. The computer system of claim 7, wherein said predetermined interval is set by said host CPU.

9. The computer system of claim 1, wherein said auto-polling unit monitoring activity on said management interface is suspended while said interrupt is asserted.

10. The computer system of claim 1, wherein said management interface is usable to set control values within said IO interface device, wherein said control values govern operation of said IO interface device.

11. A computer system, comprising:
    a host CPU;
    a network interface device coupled between a first transmission medium and a management interface to said computer system;
    an auto-polling unit configured to monitor activity on said management interface of said network interface device, wherein said auto-polling unit is configured to read a first status value from a status register within said network interface device in response to detecting a lack of activity on said management interface over a predetermined interval;
    wherein said auto-polling unit is further configured to compare said first status value to a second status value, wherein said second status value is a most recent status value read by said host CPU from said status register;
    wherein said auto-polling unit is configured to generate an interrupt to said host CPU in response to detecting a mismatch between said first status value and said second status value.

12. The computer system of claim 11, wherein said interrupt is indicative of an interrupt condition in a first communications channel which includes said network interface device and said first transmission medium.

13. The computer system of claim 12, wherein said status register includes indications of conditions selected from the group consisting of: (i) state of auto-negotiation state machine, (ii) a remote fault generated in auto-negotiation capable PHY devices, (iii) link status, and (iv) jabber detection.

14. The computer system of claim 11, wherein said network interface device is a physical layer interface (PHY) device.

15. The computer system of claim 14, wherein said status register is a PHY status register.

16. The computer system of claim 11, wherein said first transmission medium is selected from the group consisting of: (i) fiber-optic cable, (ii) unshielded twisted-pair (UTP) cable and (iii) coaxial cable.

17. The computer system of claim 11, wherein said management interface includes a clock signal and a serial data signal.

18. The computer system of claim 17, wherein said lack of activity on said management interface is detected by said auto-polling unit detecting no data transfers on said serial data signal for a predetermined number of cycles on said clock signal.

19. The computer system of claim 11, wherein said management interface is usable to set control values within said network interface device, wherein said control values govern operation of said network interface device.

20. The computer system of claim 11, wherein said auto-polling unit includes a host CPU data register configured to store said most recent status value read by said host CPU from said status register.

21. The computer system of claim 20, wherein said auto-polling unit includes a first auto-polling data register configured to store a most recent status value read by said auto-polling unit from said status register.

22. The computer system of claim 21, wherein said auto-polling unit includes a second auto-polling data register also configured to store said most recent status value read by said auto-polling unit from said status register.

23. The computer system of claim 22, wherein said auto-polling unit further includes a comparator coupled to receive current values from said host CPU data register and said first auto-polling data register, wherein said comparator is configured to assert said interrupt in response to detecting a mismatch between said current values.

24. The computer system of claim 23, wherein said host CPU is configured to perform a request for said first status value in response to receiving said interrupt.

25. The computer system of claim 24, wherein said request for said first status value also operates to cause said host CPU data register and said first auto-polling data register to update to a common value.

26. The computer system of claim 25, wherein said host CPU data register and said first auto-polling data register updating to said common value operates to clear said interrupt.

27. The computer system of claim 23 wherein said auto-polling unit is configured to supply said first status value from said second auto-polling data register in response to receiving said request for said first status value from said host CPU.

28. The computer system of claim 11, further comprising a network interface card, wherein said network interface card includes said network interface device and said auto-polling unit.

29. The computer system of claim 28, wherein said auto-polling unit is included in a LAN controller unit within said network interface card.

30. The computer system of claim 29, further comprising an IO controller coupled between said host CPU and said network interface card.

31. The computer system of claim 11, wherein said auto-polling unit is configured to continue monitoring activity on said management interface of said network interface device in response to said first status value being equal to said second status value.

32. The computer system of claim 11, wherein said status register is a first status register of a plurality of status registers within said network interface device, and wherein said host CPU is configured to determine which of said plurality of status registers is to be read for interrupt determination.

33. A method for generating an interrupt in a computer system which includes a host CPU, an IO interface device, and an auto-polling unit, said method comprising:
   said auto-polling unit monitoring activity on a management interface coupled to said IO interface device;
   said auto-polling unit detecting a lack of activity on said management interface over a predetermined interval;
   said auto-polling unit reading a first status value from a status register within said IO interface device;
   said auto-polling unit comparing said first status value to a second status value, wherein said second status value is a most recent status value read by said host CPU from said status register;
   said auto-polling unit generating said interrupt to said host CPU in response to detecting a mismatch between said first status value and said second status value.

34. The method of claim 33, further comprising continuing said monitoring in response to detecting a match between said first status value and said second status value.

35. The method of claim 33, further comprising said host CPU requesting a read of said status register in response to receiving said interrupt.

36. The method of claim 35, further comprising said auto-polling unit returning said first status value in response to said host CPU requesting said read of said status register.

37. The method of claim 36, further comprising clearing said interrupt in response to said host CPU requesting said read of said status register.

38. A computer system configured to perform auto-polling of a network interface device, comprising:
   a host CPU;
   an auto-polling unit;
   a network interface device;
   wherein said host CPU is configured to enable said auto-polling unit to perform auto-polling of said network interface device;
   wherein said auto-polling unit is configured to poll said network interface in response to detecting a lack of activity on a management interface of said network interface device, and wherein said auto-polling unit is configured to signal an interrupt to said host CPU in response to detecting a status value which indicates an interrupt condition;
   and wherein said host CPU is configured to read said status value which caused said interrupt condition;
   and wherein said host CPU is configured to de-assert said interrupt in response to reading said status value.

* * * * *

UNITED STATES PATENT AND TRADEMARK OFFICE
CERTIFICATE OF CORRECTION

PATENT NO. : 6,065,073
DATED : May 16, 2000
INVENTOR(S) : Booth

It is certified that error appears in the above-identified patent and that said Letters Patent is hereby corrected as shown below:

Column 10,
Line 20, after "FIG. 3", delete "10", insert -- IO --.

Column 14,
Line 28, delete "52013", insert -- 520B --.

Column 15,
Line 42, delete "IOA-J", insert -- I0A-J --.
Line 46, delete "IIA-J", insert -- I1A-J --.

Column 16,
Line 64, delete "27 If or", insert -- occurs, for --.

Signed and Sealed this

Thirteenth Day of May, 2003

JAMES E. ROGAN
*Director of the United States Patent and Trademark Office*